United States Patent [19]

Fukatsu

[11] Patent Number: 4,510,381

[45] Date of Patent: Apr. 9, 1985

[54] AUTOMATIC TRANSACTION MACHINE

[75] Inventor: Kunio Fukatsu, Ebina, Japan

[73] Assignee: Tokyo Shibaura Denki Kabushiki Kaisha, Kawasaki, Japan

[21] Appl. No.: 492,032

[22] Filed: May 5, 1983

[30] Foreign Application Priority Data

May 6, 1982 [JP] Japan ................................ 57-75844

[51] Int. Cl.³ ............................................ G06F 15/30

[52] U.S. Cl. ...................................... 235/379; 194/26

[58] Field of Search ............... 235/371; 194/26; 221/1

[56] References Cited

FOREIGN PATENT DOCUMENTS 1463801 9/1977 United Kingdom .

*Primary Examiner*—Harold I. Pitts

*Attorney, Agent, or Firm*—Cushman, Darby & Cushman

[57] ABSTRACT

An automatic transaction machine has an arcuated shutter which is opened/closed with respect to an operation section where transaction data is entered. The convex-shaped surface of the shutter faces the customer. An overload detector is arranged to detect an overload imposed on the shutter during the opening/closing operation thereof. A first shutter safe driving section stops the shutter or drives it in a direction opposite to the closing direction in accordance with a detection result from the overload detector. A foreign matter detector is arranged to detect foreign matter within a space enclosed by the closed shutter and the operation section. When the foreign matter detector detects foreign matter, a second shutter safe driving section stops the shutter or drives it in a direction opposite to the closing direction. After a predetermined time interval has elapsed, the second shutter safe driving section is operated to close the shutter.

9 Claims, 24 Drawing Figures

FIG. 11
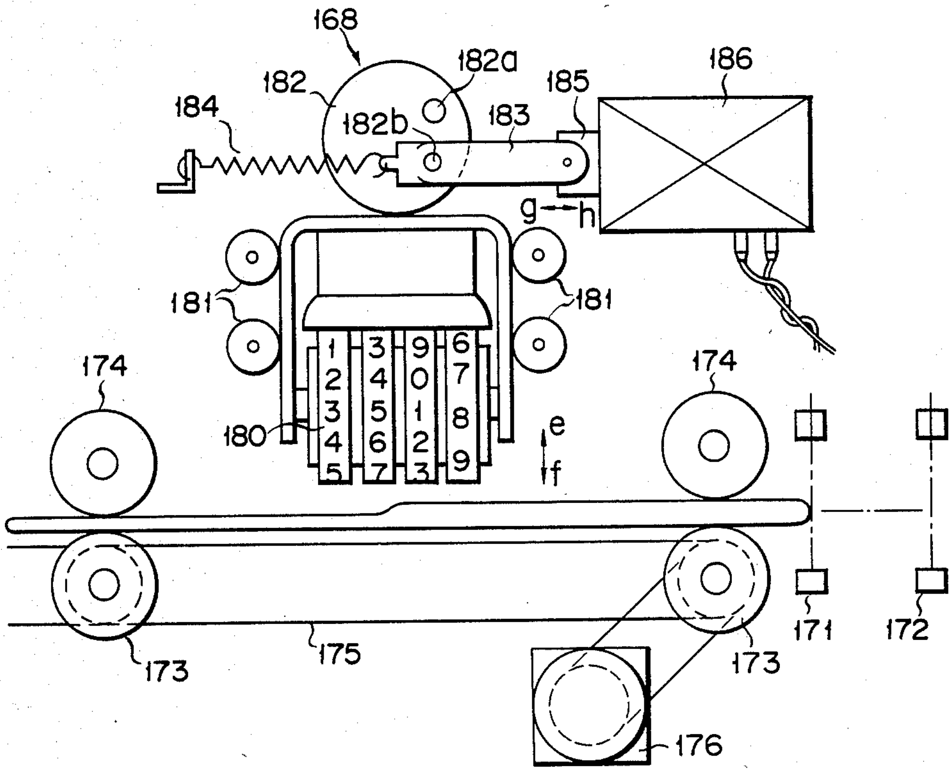
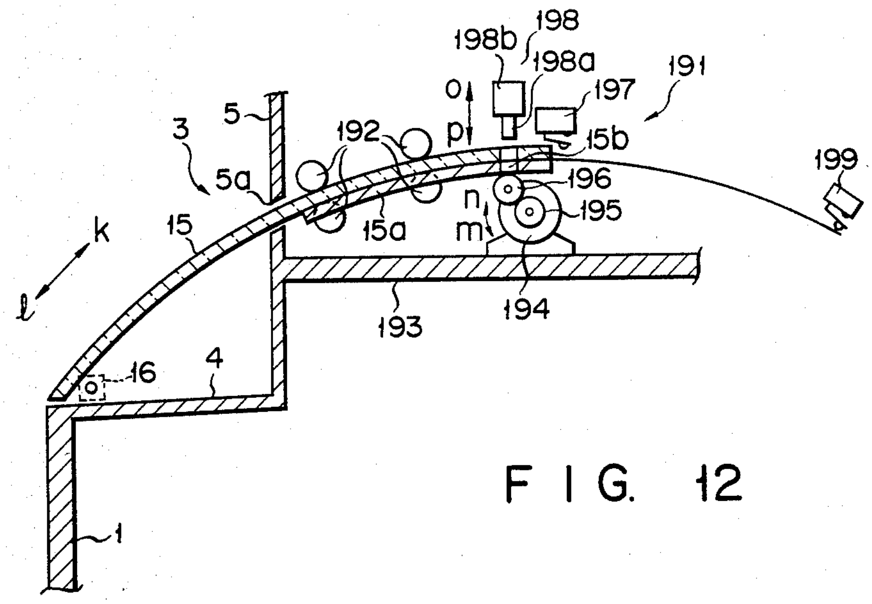
FIG. 12

AUTOMATIC TRANSACTION MACHINE

BACKGROUND OF THE INVENTION

The present invention relates to an automatic transaction machine (ATM) installed such that an operation section thereof is exposed on an outer wall of a building.

The ATM of this type is constructed as shown in FIG. 1. An operation section 304 has a vertical operation panel 302 disposed to be parallel to an outer wall surface 301 of a building and a horizontal operation panel 303 disposed to be perpendicular to the outer wall surface 301. A flat shutter 305 is disposed to protect the machine against wind, rain and dust, as well as burglars. The shutter 305 is housed in a housing when it is open, and when it is closed, those portions of the operation section 304 which include a card insertion port 306 (and bankbook insertion port) are enclosed and protected by the shutter 305.

However, in the ATM having the structure described above, since a flat shutter is used, a large space is required for the shutter to be housed in the housing, thus wasting space inside the housing and making a compact machine difficult to obtain. Furthermore, since the shutter is closed at the end of each transaction under the control of a timer, a customer who is not well acquainted with the operation may insert his hand between the shutter 305 and the horizontal operation panel 303. The conventional ATM thus has a problem from the viewpoint of safety. In order to solve this problem, a foreign matter detector may be arranged in the vicinity of the path of the shutter to detect foreign matter and thus prevent movement of the shutter. However, if the customer forgets to remove his card or bankbook from the appropriate insertion port, or if he places his belongings on the horizontal operation panel so that they are detected by the foreign matter detector, the shutter will be kept open, thus degrading the reliability of the machine.

SUMMARY OF THE INVENTION

It is, therefore, an object of the present invention to provide a compact automatic transaction machine which eliminates the need for excessive space to house a shutter therein.

It is another object of the present invention to provide a safe automatic transaction machine which prevents injury to a customer.

It is still another object of the present invention to provide a reliable automatic transaction machine which does not keep the shutter open even if foreign matter is detected, but properly closes the shutter.

According to an aspect of the present invention, there is provided an automatic transaction machine comprising: a housing having an outer portion and an inner portion with respect to a wall; a transaction medium insertion port disposed at said outer portion for inserting thereat a transaction medium on which transaction information is recorded; reading means for reading the transaction information from the transaction medium inserted at said transaction medium insertion port; an operation section for entering a sequence of transaction data associated with the transaction information on the transaction medium; means for dispensing a negotiable medium in accordance with the transaction information read by said reading means from the transaction medium and with the transaction data entered at said operation section; a shutter disposed to be opened/closed with respect to said operation section, said shutter having an arcuated shape so as to extend over the outer portion of said housing; a shutter driving section for driving said shutter so as to open/close said shutter; and a storage section for storing said shutter in said inner portion of said housing.

According to another aspect of the present invention, there is also provided an automatic transaction machine comprising: a housing having an outer portion and an inner portion with respect to a wall; a transaction medium insertion port disposed at said outer portion for inserting thereat a transaction medium on which transaction information is recorded; reading means for reading the transaction information from the transaction medium inserted at said transaction medium insertion port; an operation section for entering a sequence of transaction data associated with the transaction information on the transaction medium; means for dispensing a negotiable medium in accordance with the transaction information read by said reading means from the transaction medium and with the transaction data entered at said operation section; a shutter disposed to be opened/closed with respect to said operation section; an overload detecting means for detecting an overload imposed on said shutter while said shutter is being driven; shutter safe driving means for performing one of operations of stopping said shutter in accordance with a detection result from said overload detecting means and driving said shutter in a direction opposite to a shutter closing direction; a shutter driving section for driving said shutter so as to open/close said shutter, said shutter driving section including said overload detecting means and said shutter safe driving means; and a storage section for storing said shutter in said inner portion of said housing.

According to still another aspect of the present invention, there is also provided an automatic transaction machine comprising: a housing having an outer portion and an inner portion with respect to a wall; a transaction medium insertion port disposed at said outer portion for inserting thereat a transaction medium on which transaction information is recorded; reading means for reading the transaction information from the transaction medium inserted at said transaction medium insertion port; an operation section for entering a sequence of transaction data associated with the transaction information on the transaction medium; means for dispensing a negotiable medium in accordance with the transaction information read by said reading means from the transaction medium and with the transaction data entered at said operation section; a shutter disposed to be opened/closed with respect to said operation section; foreign matter detecting means for detecting foreign matter within a space enclosed by said shutter; and shutter safe driving means for performing one of operations of stopping movement of said shutter in accordance with detection of the foreign matter by said foreign matter detecting means and driving said shutter in a direction opposite to a shutter closing direction, and for closing said shutter after a predetermined time interval has elapsed.

BRIEF DESCRIPTION OF THE DRAWINGS

Other objects and features of the present invention will be apparent from the following description taken in connection with the accompanying drawings, in which:

FIGS. 2 through 21 illustrate an automatic transaction machine according to an embodiment of the present invention; in which FIG. 2 is a perspective view showing the outer appearance of the automatic transaction machine, FIG. 3 is a schematic view showing the internal arrangement thereof, FIG. 4 is a sectional view thereof taken along the line A–A' in FIG. 3, FIG. 5 is a sectional view thereof taken along the line B–B' in FIG. 3, FIG. 6 is a sectional view showing the schematic arrangement of a card reader thereof, FIG. 7 is a sectional view showing a bill dispensing mechanism thereof, FIG. 8 is a sectional view showing a bankbook reader/printer thereof, FIG. 9 is a sectional view showing a bag processing unit thereof, FIG. 10 is a partially cutaway perspective view showing the bag processing unit thereof, FIG. 11 is a sectional view schematically showing a printer, FIG. 12 is a sectional view showing a shutter reception mechanism, FIG. 13 is a schematic block diagram showing the overall configuration thereof, FIG. 14 is a schematic block diagram showing a speech synthesizer, FIG. 15 is a circuit diagram showing the arrangement of a current detector, FIGS. 17 and 18 show display examples at the CRT display, FIG. 19 is a graph for explaining a level of a detection signal from the current detector, and FIGS. 20 and 21 show display examples at the CRT display.

DETAILED DESCRIPTION OF THE PREFERRED EMBODIMENT

Figure 1:
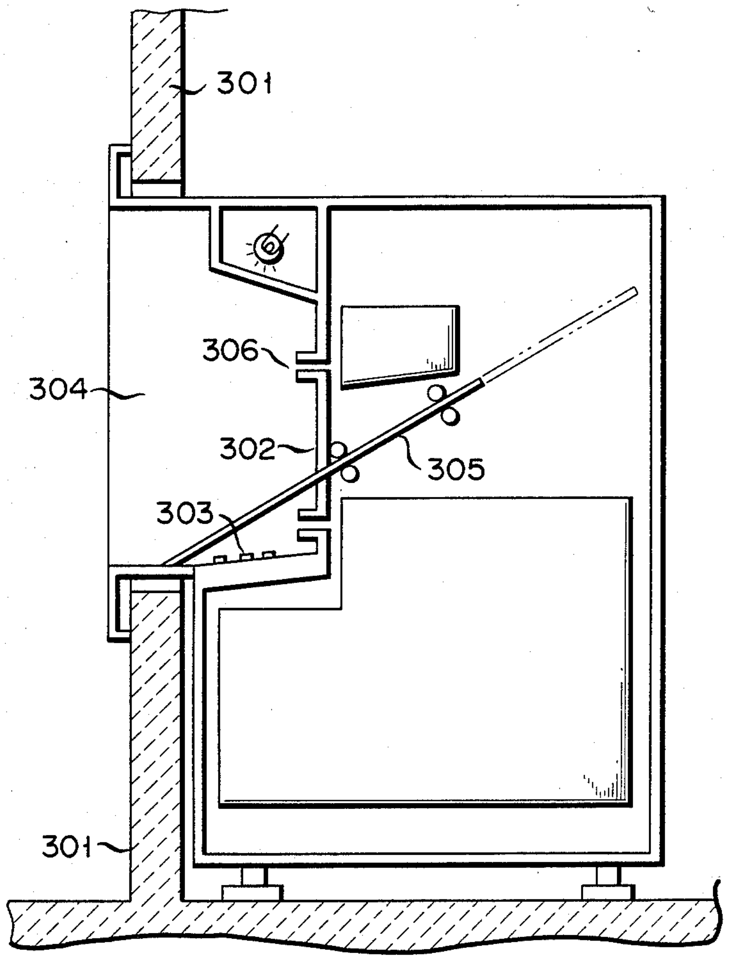
FIG. 1 (PRIOR ART)
FIG. 1 shows a structure of a conventional automatic transaction machine.
Figure 2:
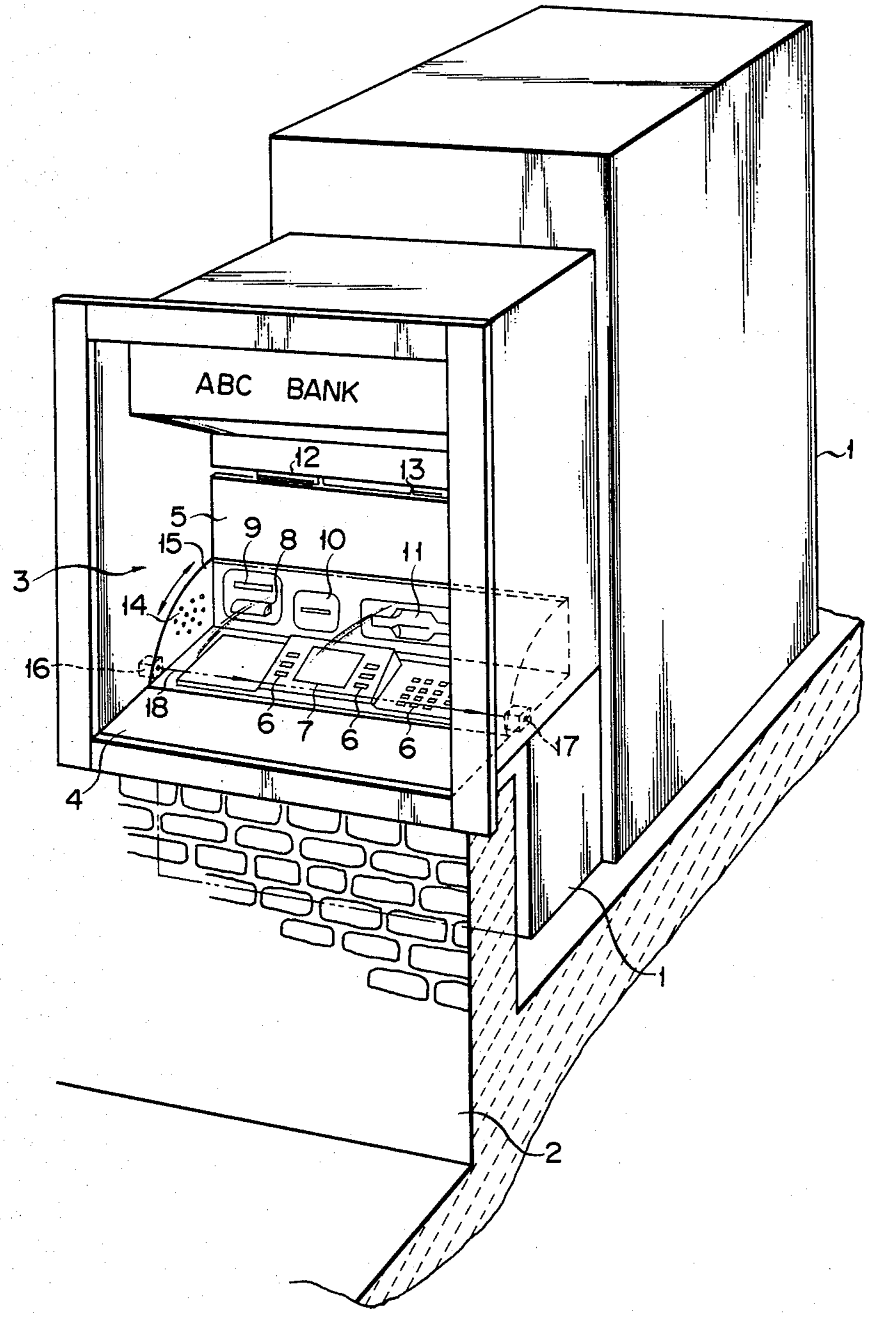

FIG. 2 shows an automatic transaction machine which is suitably installed in an outdoor wall 2. An operation section 3 of a housing 1 is disposed to open through the outdoor wall 2. The operation section 3 is disposed substantially at the center of the housing 1 with respect to the height of the housing 1. The operation section 3 has a horizontal operation panel 4 and a vertical operation panel 5 formed integrall with the rear edge of the horizontal operation panel 4. A keyboard 6 of numerical keys and a CRT display 7 are arranged in the horizontal operation panel 4. A bag dispensing port 8, a bag insertion port 9, a receipt dispensing port 10, and a bill dispensing port 11 are formed in the lower portion of the vertical operation panel 5. A bankbook insertion port 12 and a card insertion port 13 are formed in the upper portion of the vertical operation panel 5.

Apertures 14 are formed at an inner side wall of the operation section 3. A speaker (not shown) is mounted inside the wall in which the apertures 14 are formed.

An arcuated shutter 15 is disposed to close/open the operation section 3 so as to expose/cancel the keyboard 6, the CRT display 7, the bag dispensing section 8, the envelope insertion port 9, the receipt dispensing port 10, the bill dispensing port 11, and the apertures 14. The shutter 15 is disposed to protect the operation section 3 from a burglar, rain and dust. The shutter 15 comprises a transparent reinforced plastic member which forms part of a cylinder having a predetermined radius of curvature. A light-emitting element 16 and a photosensor 17 are arranged inside the two side walls of the operation section 3. The photocoupler of the photosensor 17 and the light-emitting element 16 detect a foreign material such as a paper sheet or a hand inside the shutter 15.

Figure 3:
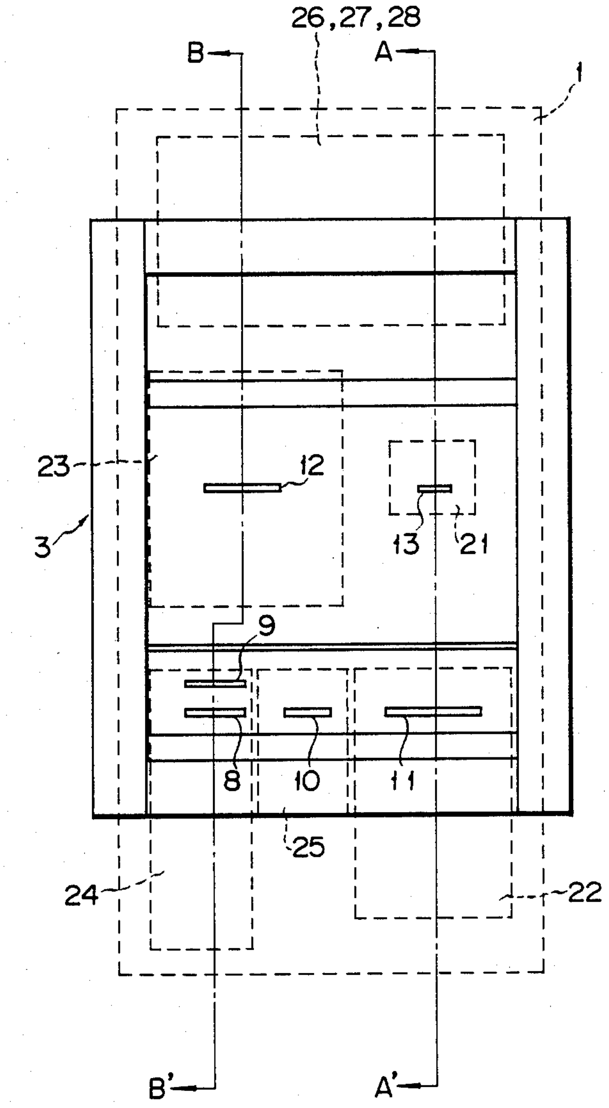
Figure 4:
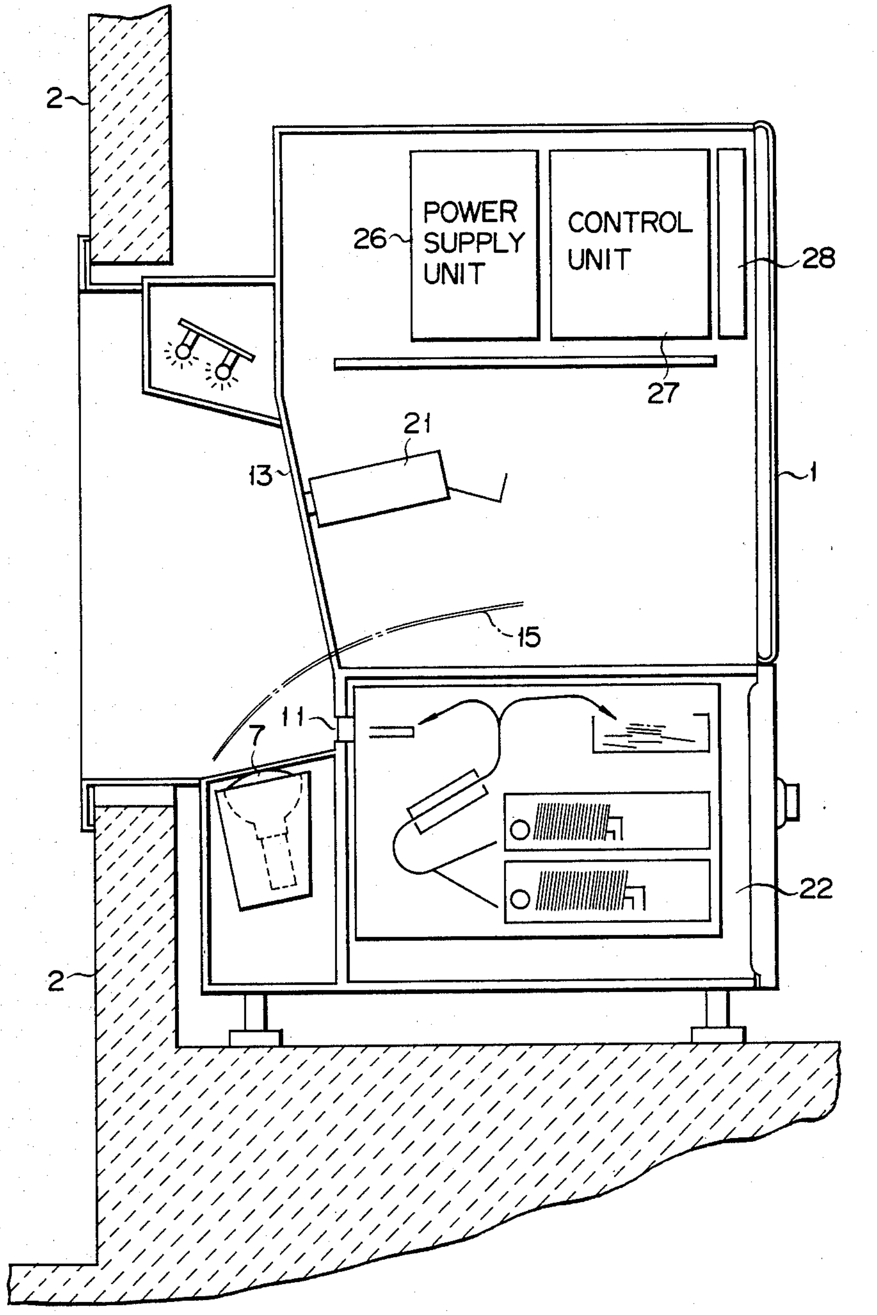
Figure 5:
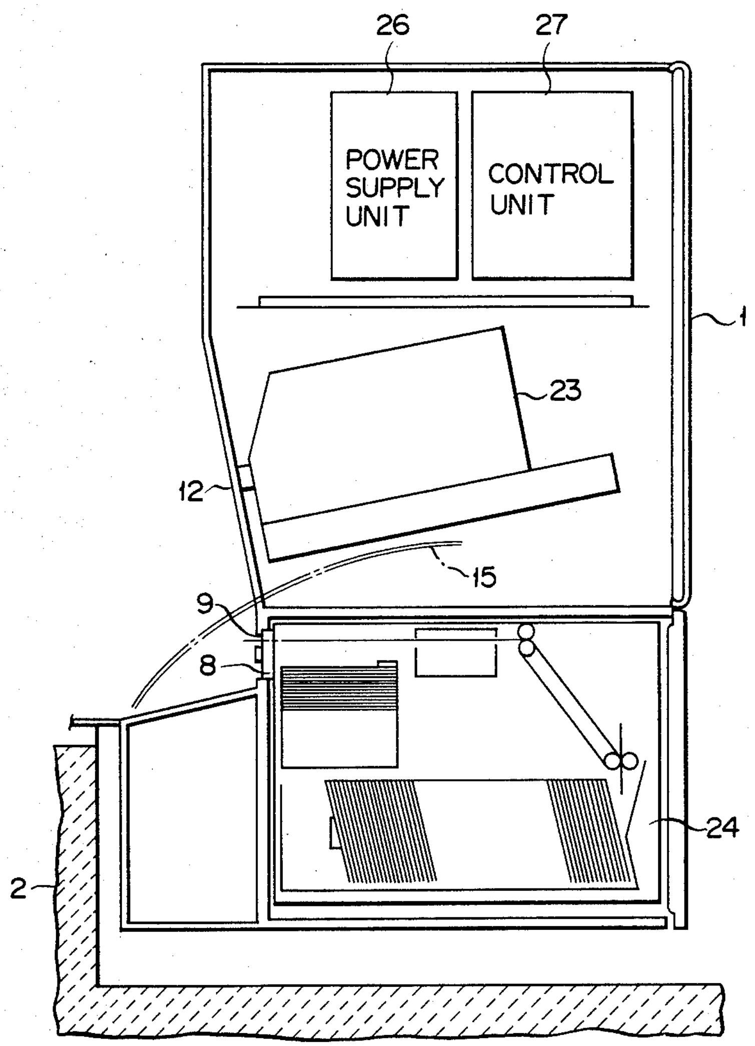

As shown in FIGS. 3 through 5, the housing 1 has: a card reader 21 for reading ID card information from an ID card inseted through the card information port 13; a bill dispensing mechanism 22 for dispensing bills P corresponding to a predetermined amount at the bill dispensing port 11; a bankbook reader/printer 23 for reading information from the magnetic strip of a bankbook inserted at the bankbook insertion port 12 and for printing details of a transaction on a journal; a bag processing unit 24 for receiving a bag (envelope) which is inserted at the bag insertion port 9 and which is printed with predetermined characters, and for dispensing such a bag at the bag dispensing port 10; a receipt issuing unit 25 for issuing a receipt which carriers printed transaction details and for dispensing it at the receipt dispensing port 10; a power supply unit 26; a control unit 27, a control panel 28; and a shutter receiving mechanism (not shown) for receiving the shutter 15.

The wall thickness of the housing portion around the bill dispensing mechanism 22 is made thick and rigid; a stainless steel plate or cold rolled steel plate which has a thickness of about 10 to 30 mm is used. A cold rolled steel having a thickness of 1 to 2 mm is used as the material for the other housing portion, thereby obtaining a burglar proof housing.

Figure 6:
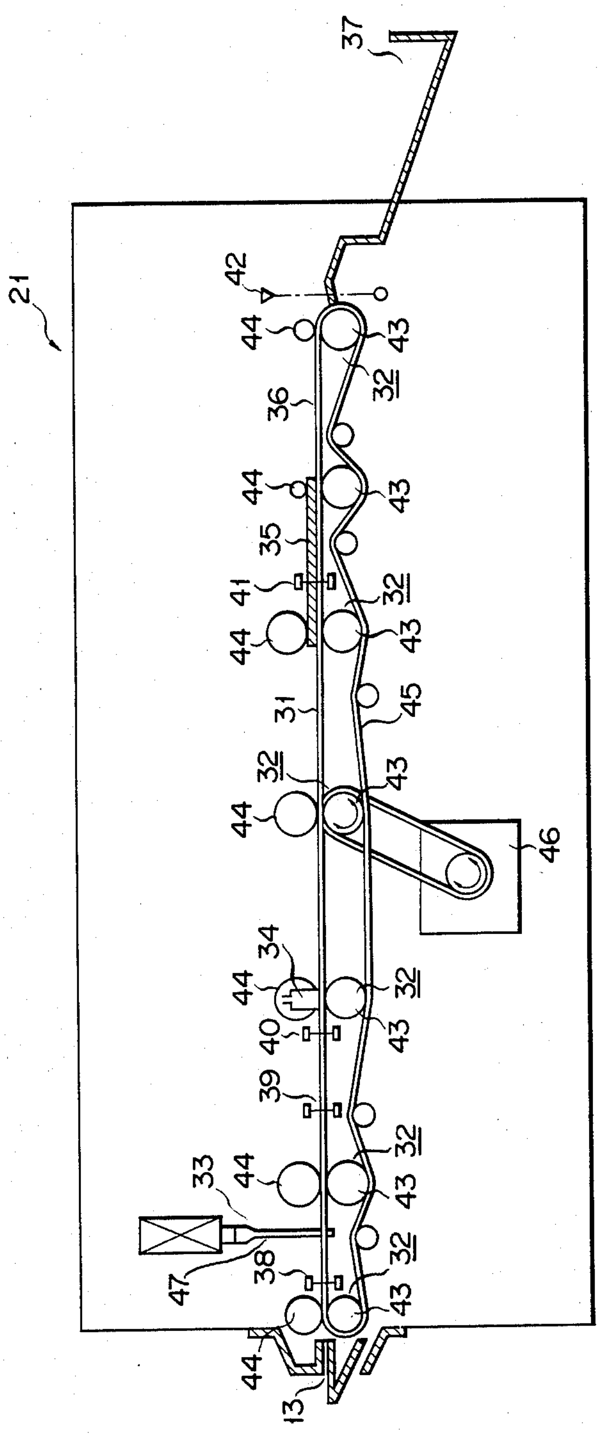

FIG. 6 shows the card reader 21. A convey path 31 of a card inserted at the card insertion port 13 comprises a plurality of paired conveyor rollers 32. A shutter mechanism 33 for card insertion port 13, a magnetic head 34, a card retention portion 35 and an embossing portion 36 are disposed along the convey path 31 from the card insertion port 13. The distal end of the convey path 31 opposes a container 37. Each of card detectors 38, 39, 40, 41 and 42 comprises a known circuit of a light-emitting element and a photosensor. The card detector 38 detects the presence of card at the insertion port; the card detector 41 detects the card at the card retention portion 35; and the detector 42 detects the card in the container 37. Each of the paired conveyor rollers 32 comprises a driver roller 43 and a pinch roller 44. A conveyor belt 45 is looped around the driver rollers 43. The pinch rollers 44 are respectively brought into contact with the driver rollers 43 through the conveyor belt 43. The driver rollers 43 are driven by a reversible pulse motor 46. The pinch roller 44 disposed nearest the card insertion port 13 has a strong urging force when the convey operation is performed and has a weak urging force when the convey operation is not performed.

The shutter mechanism 33 is disposed to open/close the conveyor path 31 between the conveyor roller 32 nearest the card insertion port 13 and the next conveyor roller 32. The shutter mechanism 33 is interlocked with the pinch roller 44 nearest the card insertion port 13 such that the urging force of the pinch roller 44 is stroing in the opened state of a shutter 47 and is weak in the closed state thereof.

The magnetic head 34 is disposed to be coaxial with the pinch rollers 44 of the paired conveyor rollers 32. While the magnetic head 34 reads information from the card, the card is held by the pinch rollers 44 so as not to change its convey condition. The retention portion 35 is formed on the convey path 31 so as to temporarily stop the card which has been conveyed. The embossing portion 36 serves to copy the account number which is recorded on the card in a three-dimensional manner onto a receipt or the like. The container 37 serves to store the recovered card and keep it therein.

When the card is inserted at the card insertion port 13 and is detected by the card detector 38, the pulse motor 46 is started and the shutter 47 is opened. The card is then conveyed along the convey path 31. The information on the card is then read by the magnetic head 34 while the card is being conveyed. The card is temporarily stopped at the embossing portion 36 and is subjected to an embossing operation. Thereafter, the pulse motor 46 is rotated in the reverse direction and the card is returned to the card insertion port 13, or is eventually recovered in the container 37. After the card has been continuously detected by the card detector 38 for a predetermined period of time, the pulse motor 46 is stopped, and the shutter 47 is closed. The card is held at the card insertion port 13 such that part of the card is exposed outside the card insertion port 13. When the user removes the card from the card insertion port 13 and the card detector 38 detects this removal, this indicates that the transaction is completed. The next transaction can then be performed from the initial step. On the other hand, when the card continues to be detected by the card detector 38 after the predetermined period of time, the pulse motor 46 is started to convey the card, the information on which is again read by the magnetic head 34, and the shutter 47 is opened. After the card has been detected by the card detector 41 for a predetermined period of time, the pulse motor 46 is stopped. In this situation, the card is kept at the card retention portion 35.

When the customer realizes that he should remove his card and so enters card return request data (i.e., depresses keys at the keyboard 6 to enter his ID number), assume that the input data coincides with the transaction details made by the card having the ID number corresponding to the input data. The pulse motor 46 is started to return the card retained in the retention portion 35, so as to dispense the card. Thereafter, the above-mentioned operating steps are repeated. Therefore, the card which is accidentally not removed by the customer can be properly and automatically returned to the customer. However, if the input data indicates an ID number which does not coincide with that recorded on the card, the above check is repeated three times. If a coincidence is not established after the above operation is repeated three times, a new transaction cannot be performed.

When the next customer depresses a selection button for a +# transaction, and before his ID number is entered, the retained card of the previous customer passes through the embossing portion 36 and the card detector 42 and is recovered in the container 37. In this case, for example, if the second customer wishes to withdraw cash, the card of this customer is inserted within a short period of time immediately after he depresses the selection button. The card insertion operation and the card recovery opertion are performed along the same convey path 31, so that the card of the previous customer can be recovered and at the same time the card of the next customer can be inserted by driving the pulse motor 46 in a predetermined direction. When the card of the previous customer has been recovered, the transaction step for the second customer is executed.

Figure 7:
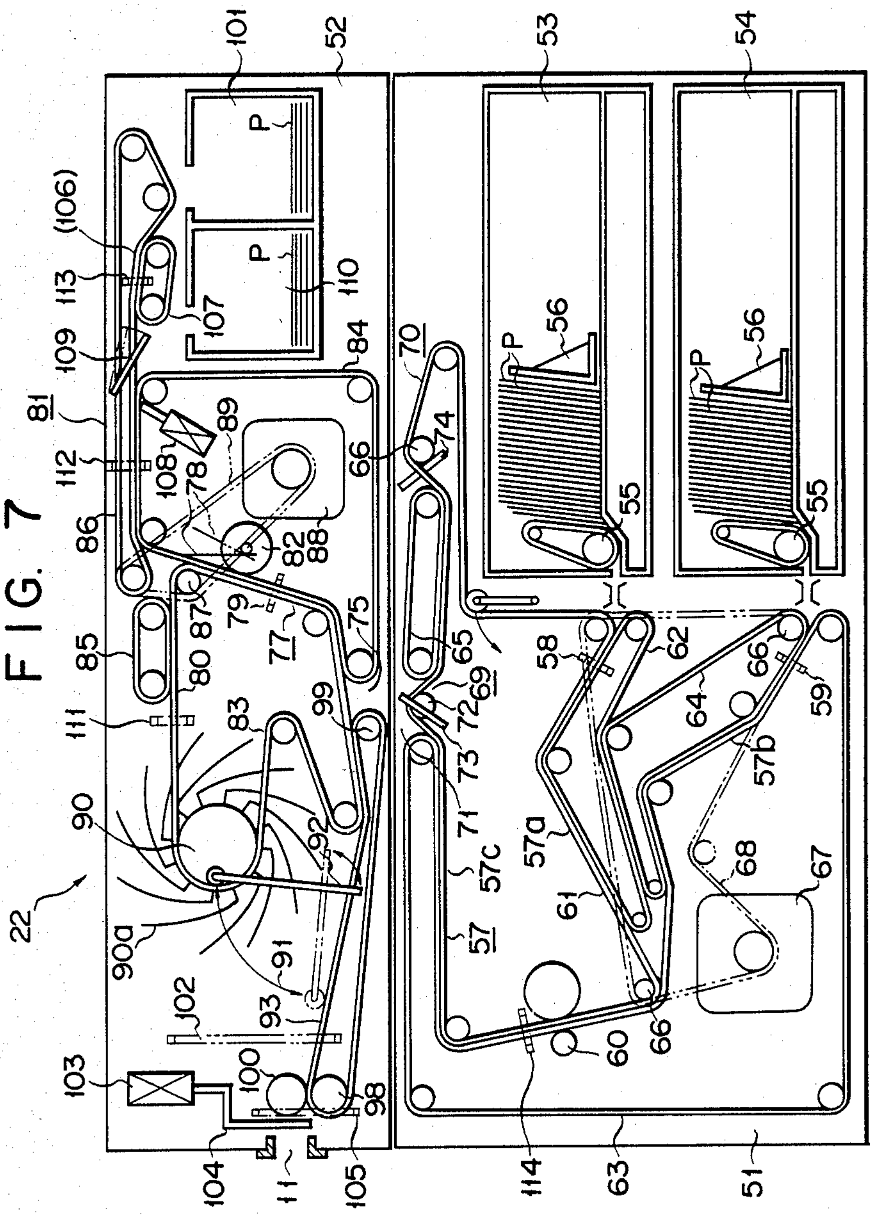

As shown in FIG. 7, the bill dispensing mechanism 22 is divided into a first unit 51 and a second unit 52. The first unit having first and second safes 53 and 54 can be rotated by 180° with respect to the second unit 52.

The first and second units 51 and 52 will be described with reference to FIG. 7. The first and second safes 53 and 54 are disposed in the front portion (right-hand side in FIG. 7) of the first unit 51 such that the first safe 53 is placed above the second safe 4. For example, ten-thousand yen bills P are stored in the first safe 53 and thousand yen bills P are stored in the second safe 54. Backup mechanisms 56 are disposed in the first and second safes 53 and 54 so as to properly urge the bills toward dispensing mechanism 55, respectively. The ten-thousand yen bill P or the thousand yen bill P is selectively dispensed.

A convey path 57 is formed at the rear portion (left-hand side in FIG. 7) of the first unit 51 so as to convey the bill P selectively dispensed from one of the first and second safes 53 and 54. The convey path 57 comprises a first convey path **57*a* for conveying the ten-thousand yen bill P dispensed from the first safe 53, a second convey path 57*b* for conveying the thousand yen bill P dispensed from the second safe 54, and a common convey path 57*c* for conveying the ten-thousand yen bill P and the thousand yen bill P respectively conveyed along the first and second convey paths 57*a* and 57*b***.

A bill detector 58 is arranged in the convey path **57*a* to detect the ten-thousand yen bill P; a bill detector 59 is arranged in the convey path 57*b* to detect the thousand yen bill P; and bill detectors 60 and 114 are arranged in the common convey path 57*c*** to detect overlaying, folding and tearing of the bill in the order named.

The first convey path **57*a* is formed at an opposing portion between each of a pair of first conveyor belts 61 (only one belt is illustrated) and each of a pair of second conveyor belts 62 (only one belt is illustrated). The second convey path 57*b* is formed at an opposing portion between each of a pair of third conveyor belts 63 (only one belt is illustrated) and each of a pair of fourth conveyor belts 64 (only one belt is illustrated). The common convey path 57*c* is formed at opposing portions between the pairs of first and third conveyor belts 61 and 63 and between the pair of first conveyor belts 61 and a pair of fifth conveyor belts 65** (only one belt is illustrated).

The driving force of a motor 67 is transmitted through a power transmission system 68 to some of rollers 66 around which the conveyor belts 61 to 65 are looped.

The common convey path **57*c* is disposed to convey the bill P upward along the front end face of the first unit 51 and horizontally convey it in the backward direction. First and second bill transfer portions 69 and 70 are formed at the horizontal portion of the common convey path 57*c* so as to selectively transfer bills to the second unit 52. The first bill transfer portion 69 is formed such that a portion of each of the first conveyor belts 61 is inserted through a press roller 72 in a space formed between the arcuated portion of each of the third conveyor belts 63 and one arcuated portion of each of the fifth conveyor belts 65. A first guide plate 73 is disposed in the first bill transfer portion 69. The second bill transfer portion 70 is formed such that the intermediate portion of each of the first conveyor belts 61 is supported by a roller 66 so as to travel along to the other arcuated portion of each of the fifth conveyor belts 65. A second guide plate 74 is disposed in the second bill transfer portion 70**.

The second unit 52 has a structure as follows. A convey path 77 is formed at the center (upper center in FIG. 7) of the length of the second unit 52 so as to receive the bill P from a bill reception port 75 and convey it upward. A first sorting gate 78 is disposed at the terminal end of the convey path 77. When the leading end of the bill P reaches a bill detector 79 arranged in the intermediate portion of the convey path 77, the bill P is selectively conveyed by a gate actuator such as a rotary solenoid to a proper bill convey path 80 or an improper bill convey path 81.

The convey path 77 is formed at an opposing portion between a pair of sixth conveyor belts 83 and a pair of seventh conveyor belts 84. The proper bill convey path 80 is formed at an opposing portion between the top surface of the horizontal portion of one of the sixth conveyor belts 83 and a surface portion of one of a pair of eighth conveyor belts 85 which overlies this horizontal portion. The improper bill convey path 81 is formed at an opposing portion between the top surface of the horizontal portion of one of the seventh conveyor belts 84 and a surface portion of one of a pair of ninth conveyor belts 86 which overlies this horizontal portion.

The conveyor belts 83 to 86 travel in predetermined directions when a driving force of a motor 88 is transmitted through a power transmission system 89 to some of rollers 87 around which the conveyor belts 83 to 86 are looped.

Impellers 90 are disposed at the terminal end of the proper bill convey path 80. The proper bill P is held between two adjacent blades 90*a* of each of the impellers 90. Upon rotation of the impellers 90, the proper bill P is carried to a temporary stacking section 91. The bill P is then separated from the impellers 90 respectively by separation stoppers 92. The bill P is then stacked on bill dispensing/recovery conveyor belts 93 which form the lower side of the temporary stacking section 91.

The conveyor belts 93 are looped between a roller 98 disposed in the vicinity of the bill dispensing port 11 and a roller 99 disposed in the vicinity of the bill reception port 75. A pinch roller 100 is brought into tight contact with the upper portion of the roller 98 through the conveyor belts 93 in the vicinity of the bill dispensing port 11. A portion of each of the sixth conveyor belts 83 overlaps the upper portion of each of the conveyor belts 93.

The bills P stacked in the temporary stacking section 91 are conveyed to the bill dispensing port 11 or to a recovery container 101 in accordance with the separation stoppers 92 serving as urging members and the convey direction of the conveyor belts 93.

A bill detector 102 is arranged between the pinch roller 100 and the temporary stacking section 51 to detect the trailing ends of stacked bills P to be dispensed at the bill dispensing port 11. The bill detector 102 serves to stop travel of the conveyor belts 93. A shutter 104 for bill dispensing port 11 is disposed between the bill dispensing port 11 and the pinch roller 100 and can be opened/closed by a solenoid 103. A bill detector 105 is arranged behind the shutter 104 when viewed in the convey direction away from the bill dispensing port 11.

When the customer forgets to remove dispensed bills P as the bill dispensing port 11, or when improper bills dispensing port 11, or when improper bills P are erroneously stacked in the temporary stacking section 91, these bills P are delivered through a bill recovery convey path 106 and are recovered in the recovery container 101 is disposed at the rear portion of the second unit 52. The convey path 106 is formed by the upper portion of each of the conveyor belts 93, the convey path 77, the convey path 81 and the rear lower surface of each of the ninth belts 86 overlying a pair of 10th conveyor belts 107. The terminal end of the convey path 106 opposes the recovery container 101.

A second sorting gate 109 is disposed in the vicinity of the terminal end of the improper bill convey path 81 constituting an intermediate portion of the convey path 106. The second sorting gate 109 is operated by a solenoid 108. By means of the second sorting gate 109, improper bills P are delivered to a rejected bill container 110 disposed in front of the recovery container 101, and the recovered bills P are directly delivered to the recovery container 101.

A bill detector 111 is arranged in the intermediate portion of the convey path 80; an improper bill detector 112 is arranged in the intermediate portion of the convey path 81 to detect an improper bill P; and a bill detector 113 is arranged in the intermediate portion of the bill recovery convey path 106 to detect a bill passing therealong.

It should be noted that each of the bill detectors 58, 59, 79, 102, 111, 112, 113 and 114 comprises a known photocoupler of a light-emitting element and a photosensor.

Figure 8:
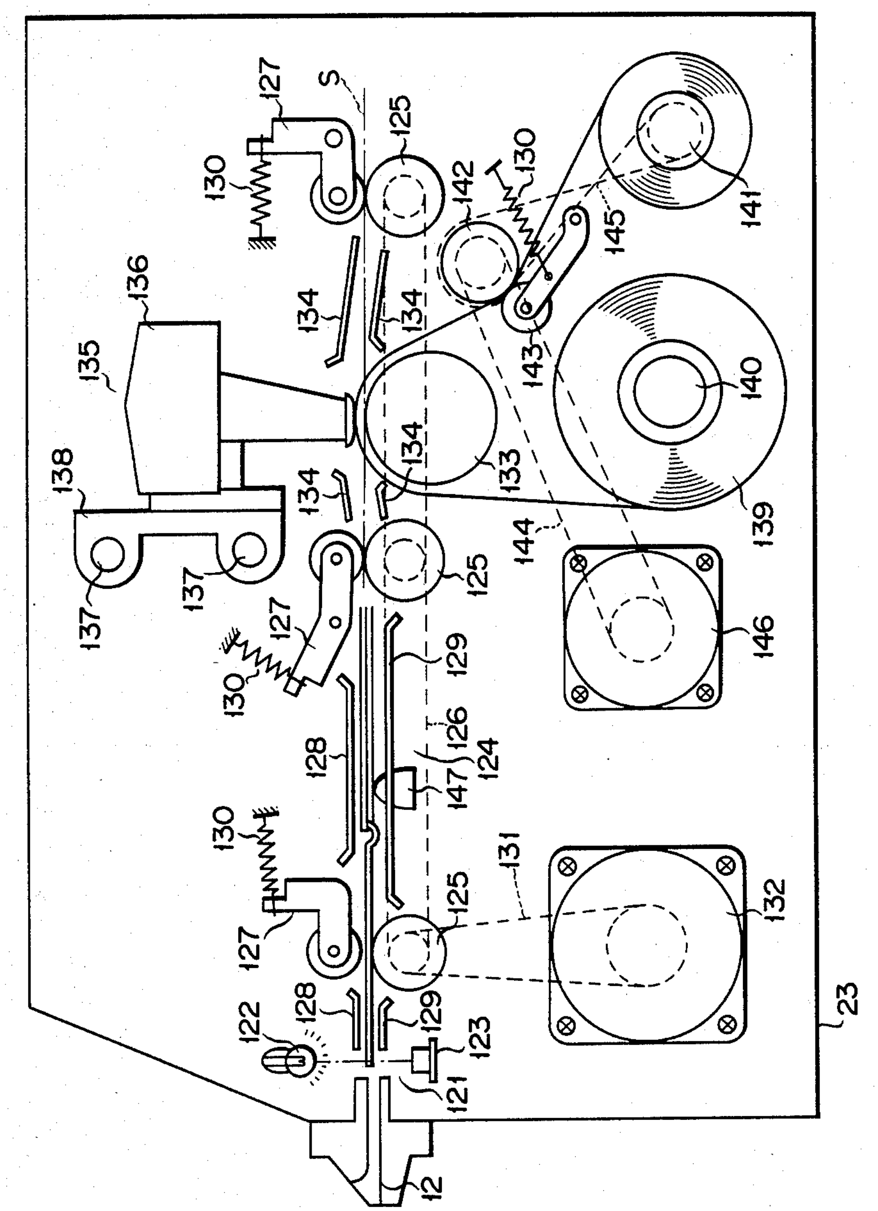

FIG. 8 shows the bankbook reader/printer 23. A pair of photodetectors 121 are arranged inside the bankbook reader 23 in the vicinity of the bankbook insertion port 12. Each of the detectors comprises a light source 122 and a photosensor 123. A convey path 124 is disposed from the pair of detectors 121 toward the inside of the bankbook reader/printer 23. The convey path 124 comprises a belt 126 looped around rollers 125, pinch rollers 127, and upper and lower guide plates 128 and 129. A magnetic head 147 is mounted on the guide plate 129 to read data from the magnetic strip of the bankbook. The pinch rollers 127 are urged by respective springs 130 toward the respective rollers 125. The rollers 125 are driven by a pulse motor 132 through a belt 131. A platen 133 is disposed to extend upward to a level higher than that of a convey reference surface S of the convey path 124. Two pairs of press guide members 134 are disposed at the front and rear portions, respectively, of the platen 133 to clamp the bankbook therebetween, and are inclined to move it upward toward the upper surface of the platen 133. A printer 135 is disposed to oppose the platen 133 through the convey path 124. The printer 135 comprises a printing head 136, and a carriage 138 for supporting the printing head 136 so as to move it along a sliding rod 137 in a direction parallel to the axis of the platen 133. The carriage 138 is driven by a pulse motor (not shown). A journal paper roll 139 is mounted on the platen 133. The journal paper roll 139 is mounted around a supply reel 140 and is taken up by a takeup reel 141. The journal paper roll 139 is clamped between a supply roller 142 and a pinch roller 143 opposed thereto and is fed to the side of the takeup reel 141. The pinch roller 143 is urged by a corresponding spring 130 toward the supply roller 142. The supply roller 142 and the takeup reel 141 are driven by a pulse motor 146 through belts 144 and 145, respectively. The takeup reel 141 is rotated at a faster speed than is the supply roller 142. When a heavy load is imposed on the takeup reel, the belt 145 slips off therefrom.

Figure 9:
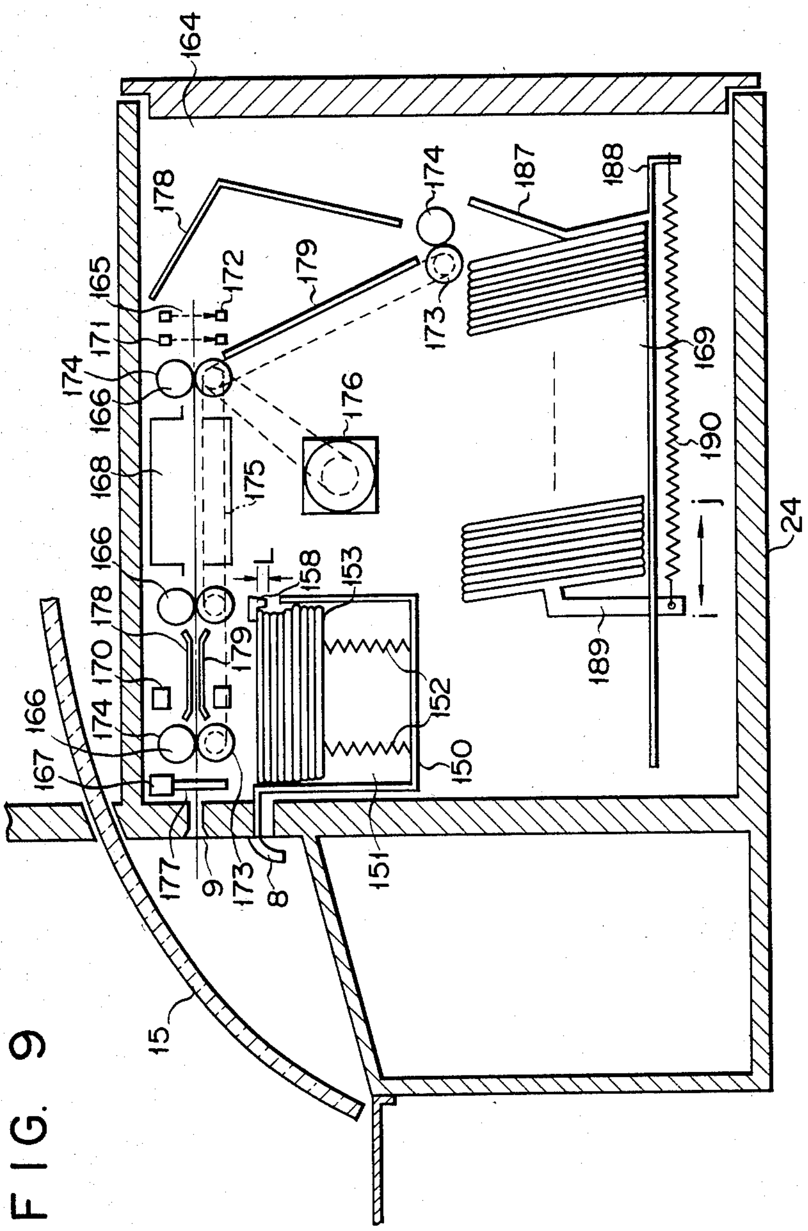
Figure 10:
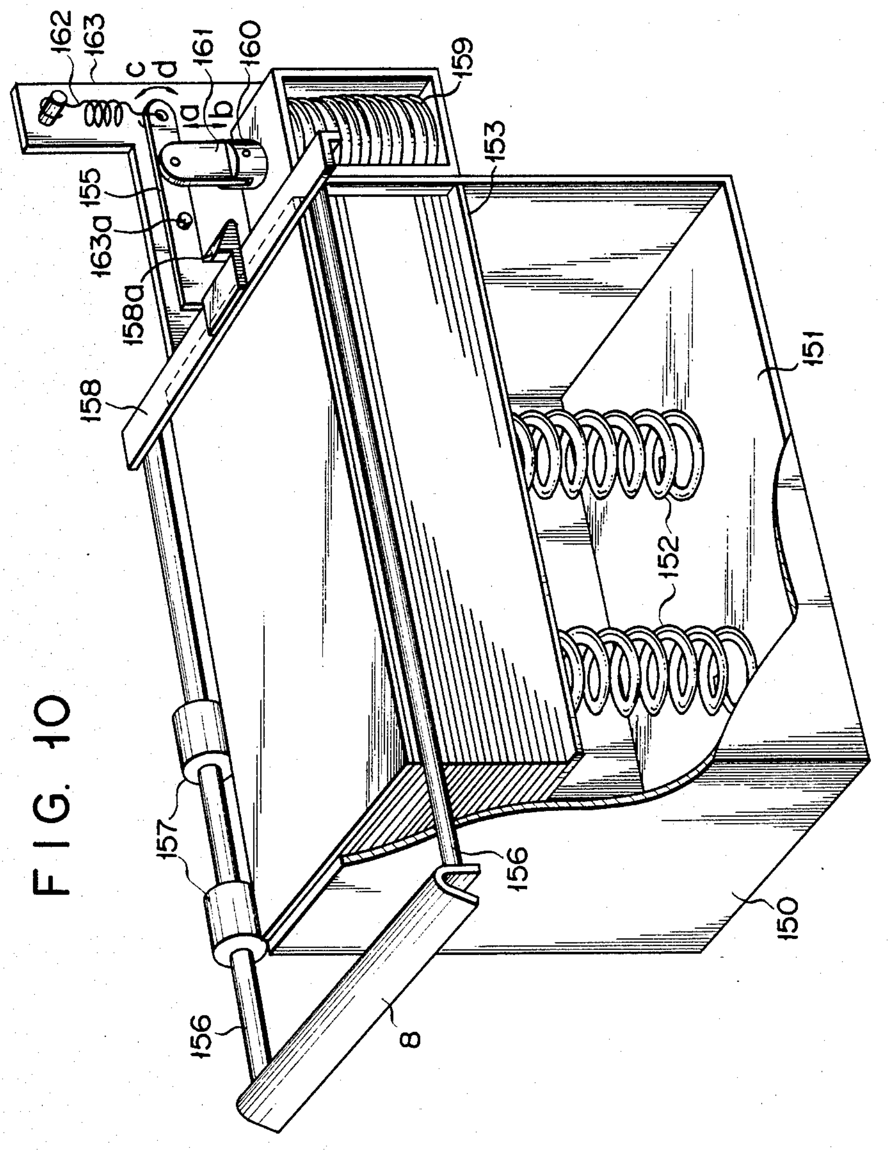

FIG. 9 shows the bag processing unit. A bag issuing unit 150 is disposed just inside the unit (e.g., the handle 8). The bag issuing unit 150 dispenses individual bags to be used for holding bills which are to be deposited. The bag cannot be obtained without selection of the deposition transaction. The bag issuing unit 150 has a press plate 153, which is pressed by springs 152, in a hopper 151, as shown in FIG. 10. New bags are stakced on the press plate 153. One end of each of shafts 156 is slidably mounted on each end of the handle 8 through each of opening portions 154 formed at the operation section 3. The shafts 156 are slidably supported by supports 157 disposed at the upper portion of the hopper 151, respectively. A bag dispensing plate 158 is disposed to extend across the other end of one shaft 156 and the other end of the other shaft 156. The bag dispensing plate 158 has an L-shaped structure. A width L of the bag dispensing plate 158 corresponds to approximately the thickness of a single bag. A locking pawl 158*a* is disposed at the upper portion of the bag dispensing plate 158. A solenoid 159 is disposed at the right side (in FIG. 9) of the hopper 151. When the solenoid 159 is energized, a plunger 160 is vertically moved in directions as indicated by arrows a and b. A coupling lever 161 is connected to the plunger 160. The coupling lever 161 is also connected to a projection 155*a* of a locking arm 155. One end of the locking arm 155 can engage with the locking pawl 158*a*, and the other end thereof is connected to a plate 163, fixed in the hopper 151, through a spring 162. The locking arm 155 pivots about a projection 163*a* formed on the plate 163 in directions indicated by arrows c and d upon movement of the coupling lever 161. After a customer has pulled the handle 8, the handle 8 may be pushed back by the customer or may be automatically returned by a spring (not shown) to the closed position.

A bag storage portion 164 is disposed inside the bag insertion port 9. A convey path 165 for a bag inserted at the bag insertion port 9 comprises a plurality of paired convey rollers 166 and upper and lower guide plates 178 and 179. A shutter mechanism 167 and a printer 168 are disposed along the convey path 165 extending inward from the bag insertion port 9 in the order named. The terminal end of the convey path 165 opposes a hopper 169. Each of bag detectors 170, 171 and 172 comprises a known photocoupler of a light-emitting element and a photosensor. The bag detector 170 serves to detect the bag at the bag insertion port; and the bag detectors 171 and 172 are used for detecting the bag during the printing operation. Each of the paired convey rollers 166 comprises a dirver roller 173 and a pinch roller 174. A conveyor belt 175 is looped around the driver roller 173. The pinch roller 174 rotatably contacts the respective driver roller 173 through the conveyor belt 175. The shutter mechanism 167 is disposed between the bag insertion port 9 and the paired convey rollers 166 so as to extend a shutter 177 across the convey path 165 or so as to withdraw the shutter 177 from across the convey path 165.

FIG. 11 schematically shows the structure of the printer 168. An index stamper 180 having numerical figures embossed on its outer surface is disposed in the printer. The index stamper 180 is guided by guide rollers 181. The index stamper 180 is vertically moved while a cam plate 182 pivots about a shaft 182*a*. A coupling lever 183 is connected to a projection 182*b* of the cam plate 182. The coupling lever 183 is urged by a spring 184 which is hooked at one end of the coupling lever 183 in directions indicated by arrows e and f. A plunger 185 is connected to the other end of the coupling lever 183. When a solenoid 186 is energized, the plunger 185 is moved along directions indicated by arrows g and h. When the leading end of the bag is detected by the bag detector 171, the pulse motor 176 is stopped, and the solenoid 186 is energized, thereby moving the index stamper 180 and printing a numbered stamp on the bag. When the pulse motor 176 is then driven and the bag detector 172 detects the leading end of the bag, the pulse motor 176 is stopped again and the solenoid 186 is energized, thereby moving the index stamper 180 and printing another stamp on the bag.

The hopper 169 stores the bags which have been sequentially conveyed along the convey path 165. The hopper 169 comprises a guide plate 187, a table 188, a support member 189 for keeping the bags upright on the table 188, and a spring 190 for urging the support member 189 in directions indicated by arrows i and j, as shown in FIG. 9.

FIG. 12 shows a shutter receiving mechanism 191 for receiving the arcuated shutter 15. The shutter 15 comprises part of a cylinder having a predetermined radius of curvature. The shutter is supported between pairs of rollers 192 in the housing 1. The shutter 16 slides from the inside of the housing 1 through an opening 5*a* in the vertical operation panel 5 so as to close off the operation section 3. A DC motor (driving section) 194 is mounted on a partition plate 193 disposed substantially at the center of the housing 1. A rubber roller 195 is mounted on a rotating shaft of the DC motor 194. The rubber roller 195 is brought into tight contact with a rubber roller 196. The rubber roller 196 is mounted directly on a power transmitting member 15*a* (e.g., a plastic plate) disposed at part of the lower portion of the arcuated shutter 15. Upon rotation of the DC motor 194, the arcuated shutter 15 is moved in directions indicated by arrows k and l. A detector 197 is arranged in the vicinity of a position corresponding to the end portion of the shutter 15 inside the housing 1 when the arcuated shutter 15 is closed to cover the operation section 3. The detector 197 detects closing of the arcuated shutter 15. A lock mechanism 198 is disposed to lock the arcuated shutter 15 in the closed position. A detector 199 is arranged in the vicinity of a position corresponding to the end portion of the arcuated shutter when it is received inside the housing 1. The detectors 197 and 199 comprise microswitches, respectively, and are turned on/off by the arcuated shutter 15.

The locking mechanism 198 comprises: a fitting member 198*a* which fits across the opening 15*b* which receives the arcuated shutter 15; and a solenoid 198*b* for vertically (in directions indicated by arrows o and p) moving the fitting member 198*a*. The shutter receiving mechanism 191 is disposed between the first and second units, or between a unit and a partition plate.

Figure 13:
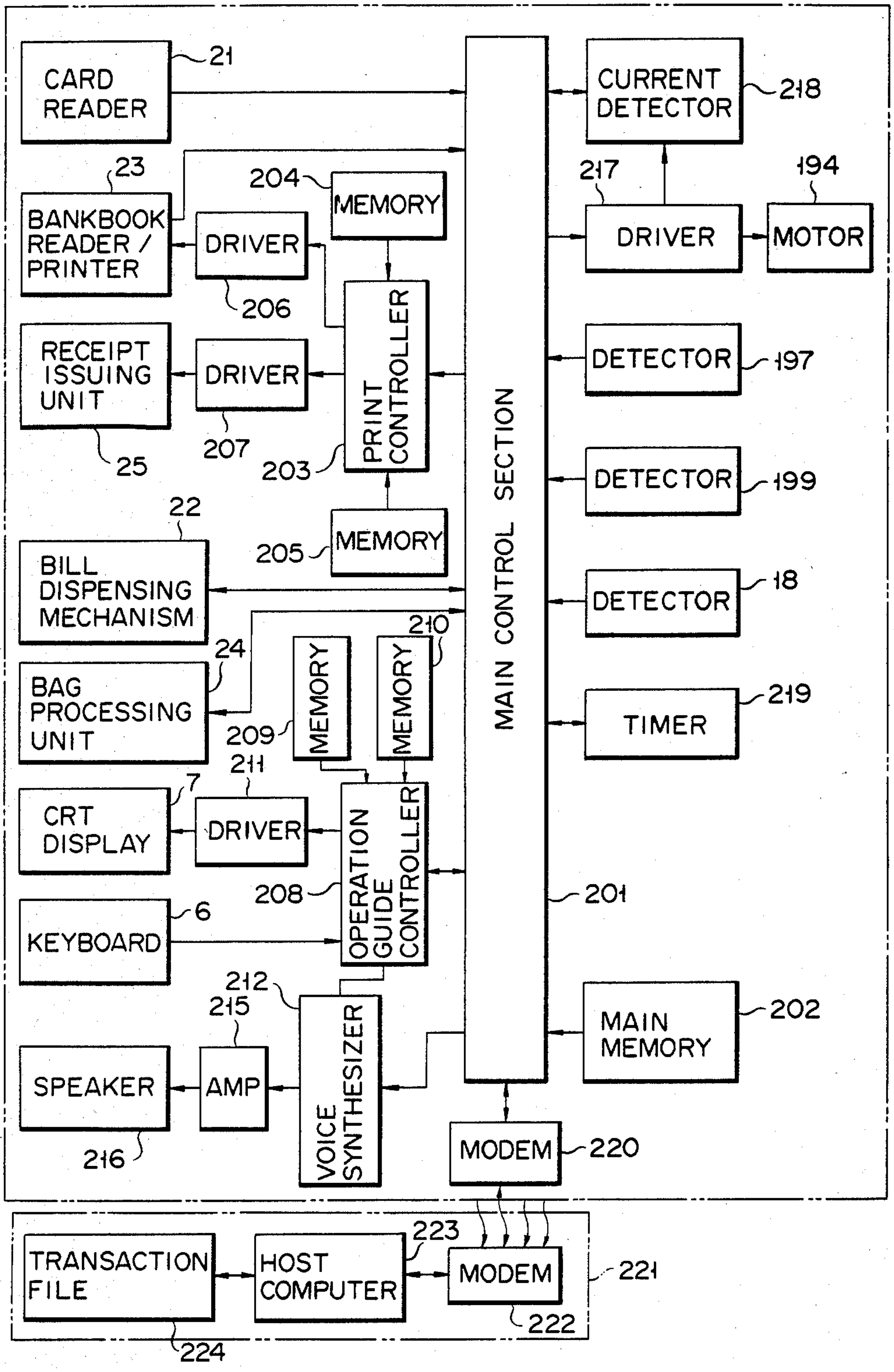

FIG. 13 is a block diagram of the control system of the automatic teller machine. A main control section 201 comprises a microprocessor. The microprocessor may comprise an 8-bit microprocessor manufactured by Intel Corp.

A main memory 202 comprises a ROM (read-only memory) which stores a control program and the like. A print controller 203 controls production of print data corresponding to either English pattern data stored in a memory 204 or Japanese pattern data stored in a memory 205. A driver 206 drives the printer 135 in the bankbook reader/printer 23 in accordance with print data from the print controller 203. A driver 207 drives a printer in the receipt issuing unit 25 in accordance with the print data from the print controller 203. An operation/guide controller 208 controls production of display data corresponding to either Japanese pattern data stored in a memory 209 or English pattern data stored in a memory 210, in accordance with a signal from the main control section 201. The operation/guide controller 208 produces operation data or a voice selection signal in accordance with a key input at the keyboard 6. A driver 211 drives a CRT display 7 in accordance with the display data or the operation data from the operation/guide controller 208. A voice synthesizer 212 produces a voice signal at a speaker 216 through an amplifier 215. This voice signal corresponds to either Japanese voice data or English voice data in accordance with the voice selection signal so as to produce speech sound guide messages at the speaker 216. Since the speaker 216 is disposed inside the arcuated shutter 15 when the shutter 15 is closed, the speaker 216 is protected against rain and wind, thereby lengthening its service life. A driver 217 drives the motor 194 in the forward or reverse direction in accordance with the open/close driving signal from the main control section 201. The driver 217 causes the motor 194 to stop/drive in response to a detection signal from a current detector (overload detecting means) 218. The current detector 218 detects a driving current of the driver 217. In this case, the current detector 218 detects a current of a different level in the case of driving the motor 194 in the forward direction (i.e., direction indicated by arrow m) than in the case of driving the motor 194 in the reverse direction (i.e., direction indicated by arrow n).

When the arcuated shutter 15 is opened and the foreign matter detector 18 detects a foreign matter, the main control section 201 causes a timer 219 to operate. When a predetermined time interval has elapsed, the timer 219 produces a timeout signal. The timeout signal causes supply of a close driving signal for closing the arcuated shutter 15 to the driver 217. The main control section 201 performs data exchange with a central processing unit 221 through a modem 220. The central processing unit 221 comprises: a modem 222 for controlling data transfer; a host computer 223 for controlling data processing, and a transaction data file 224 for filing transaction data.

Figure 14:
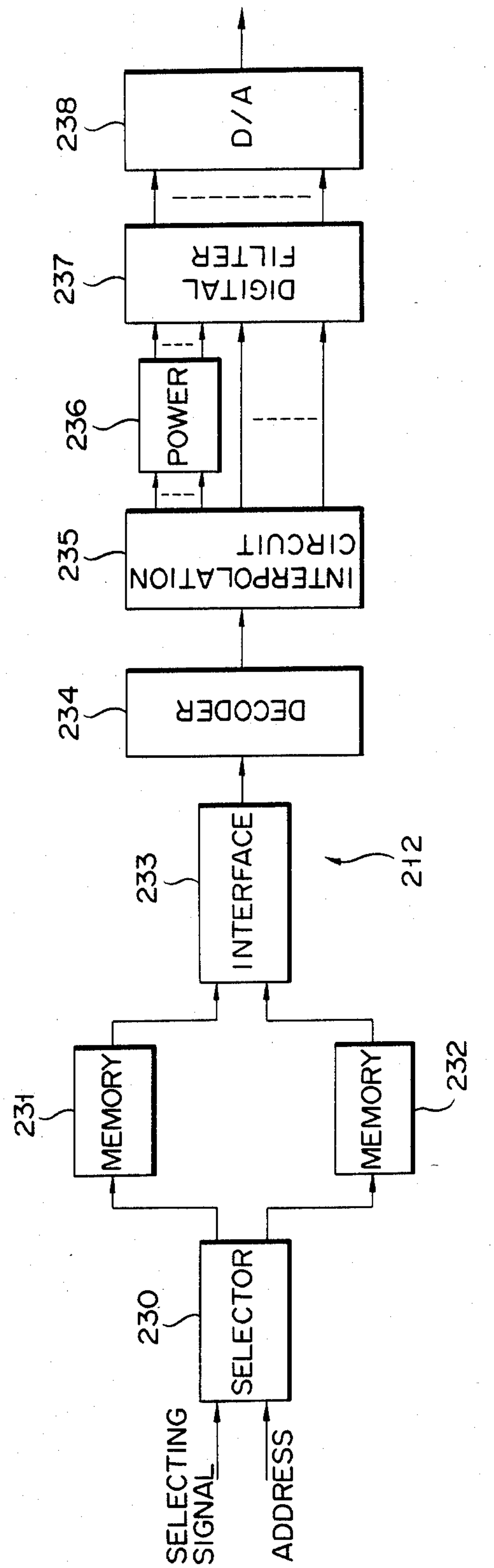

The voice synthesizer 212 will be described in detail with reference to FIG. 14. A selector 230 receives a start address (of voice data) from the main control section 201 and produces it to a memory 231 or 232 in accordance with the selecting signal from the operation/guide controller 208 so as to read out either Japanese or English voice data.

The memory 231 stores data which comprises speech parameters corresponding to various types of Japanese sounds. These parameters are a reference frequency, a difference between voiced and voiceless sounds, and a voice source (power) magnitude all of which are included in glottal characteristics. The memory 232 stores data which comprises speech parameters corresponding to various types of English sounds. These parameters are a reference frequency, a difference between voiced and voiceless sounds, and a power magnitude, all of which are included in glottal characteristics.

Output data from one of the memories 231 and 232 is supplied to a decoder 234 through an interface 233. The decoder 234 decodes each of the speech parameter data supplied thereto and converts it to serial data. An output signal from the decoder 234 is supplied to an interpolation circuit 235. The interpolation circuit 235 performs linear interpolation at several arbitrary points of a frame (duration of periodic updating of speech parameters) for all the speech parameters of a predetermined bit so as to smoothly update the speech parameters from one frame to another.

Voice source data from the interpolation circuit 235 is supplied to a power circuit 236. The power circuit 236 produces periodic impulses (white noise signals) in accordance with the supplied power (voice source) data. An output signal from the power circuit 236 is supplied to a digital filter 237 which then synthesizes a voice signal by adding a correlation factor in accordance with a filter coefficient. It should be noted that the correlation factor has been eliminated from the interpolation circuit 235 in the process of analysis. The power circuit 236 comprises a known circuit of a pipeline multiplier, an adder/subtractor and a delay circuit. Each bit output signal from the digital filter 237 is supplied to a digital-analog converter (D/A converter) 238. The signal (i.e., the synthesized voice signal) converted by the D/A converter 238 is amplified by the amplifier 215 and is supplied to the speaker 216. The voice sounds are then produced at the speaker 216.

Figure 15:
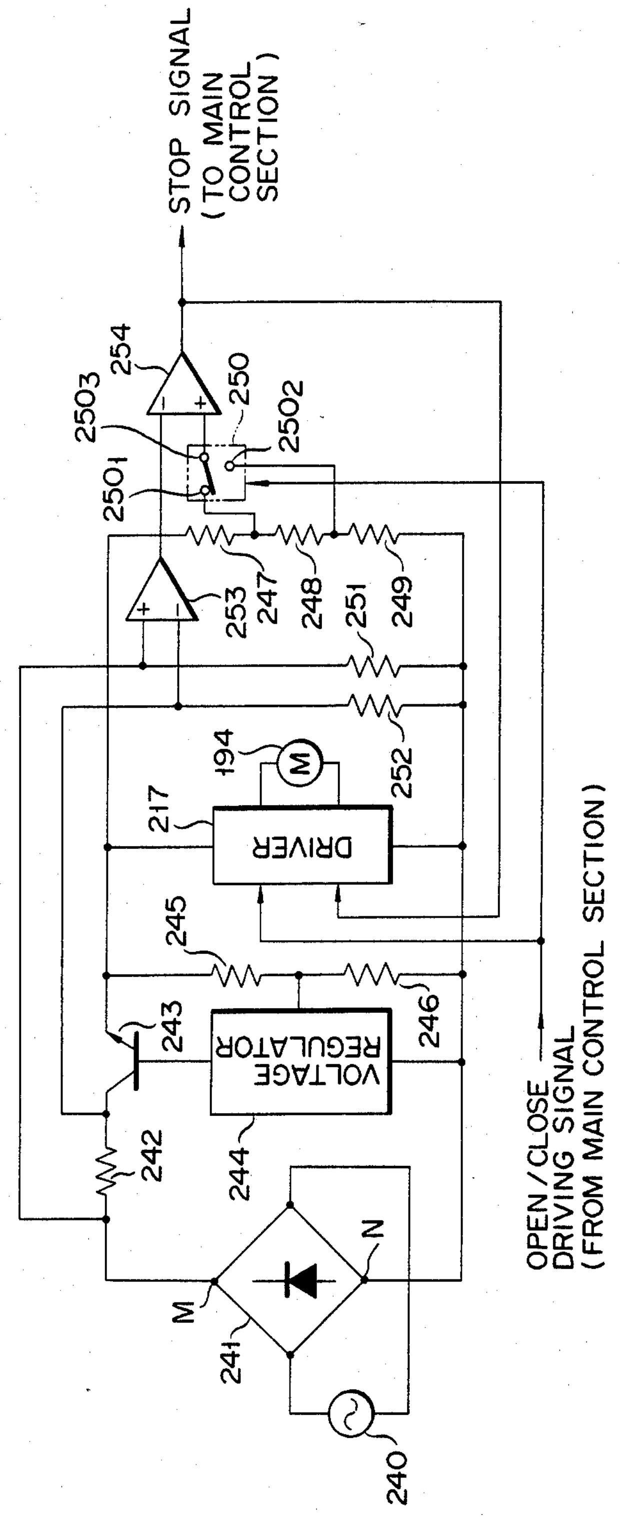

FIG. 15 is a circuit diagram of the shutter receiving mechanism 191. Two terminals of an AC power supply 240 are connected to DC input ends of a rectifier 214, respectively. A DC positive output end M of the rectifier 241 is connected to the collector of an npn transistor 243 through a resistor 242. A constant voltage circuit 244 is connected between the base of the npn transistor 243 and a DC negative output end N of the rectifier 241. A series circuit (of resistors 245 and 246), the driver circuit 217 and a series circuit (of resistors 247, 248 and 249) are connected between the emitter of the npn transistor 243 and the output end N. The output end of the constant voltage circuit 244 is connected to the node between the resistors 245 and 246. The driver 217 drives the motor 194 in the forward or revese direction in accordance with the open/close driving signal from the main control section 201. The driver 217 also stops the motor 194 in accordance with the output signal from a differential amplifier 253 to be described later. A contact $250_1$ of a switch 250 is connected to the common node between the resistors 247 and 248. A contact $250_2$ of the switch 250 is connected to the common node between the resistors 248 and 249. The switch 250 is switched by the open/close driving signal from the main control section 201. A resistor 251 is connected between the output ends M and N. A resistor 252 is connected between the collector of the npn transistor 242 and the output end N. The noninverting input end of the differential amplifier 253 is connected to the common node between the output end M and the resistor 251. The inverting input end of the differential amplifier 253 is connected to the common node between the collector of the npn transistor 243 and the resistor 252. The differential amplifier 253 produces a predetermined current which is obtained by subtracting a current at the resistor 242. The output end of the differential amplifier 253 is connected to the inverting input end of a differential amplifier 254. A movable contact $250_3$ of the switch 250 is connected to the noninverting input end of the differential amplifier 254. The output end of the differential amplifier 254 is connected to the input end of the driver 217. The output signal from the differential amplifier 254 is supplied as a stop signal to the main control section 201.

Figure 16C:
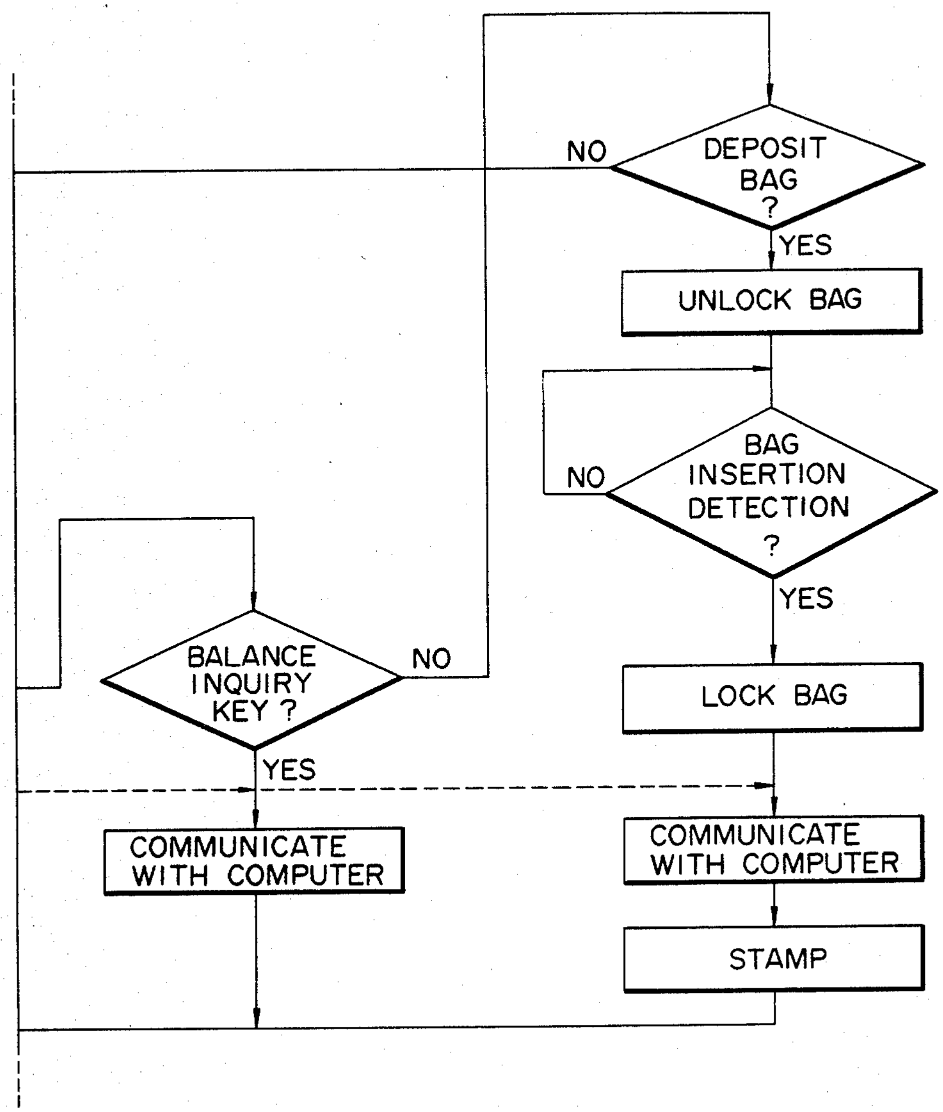
FIGS. 16A through 16C are flow charts for explaining the operation thereof.
Figure 16:
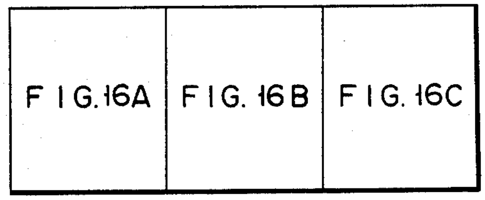
Figure 16A:
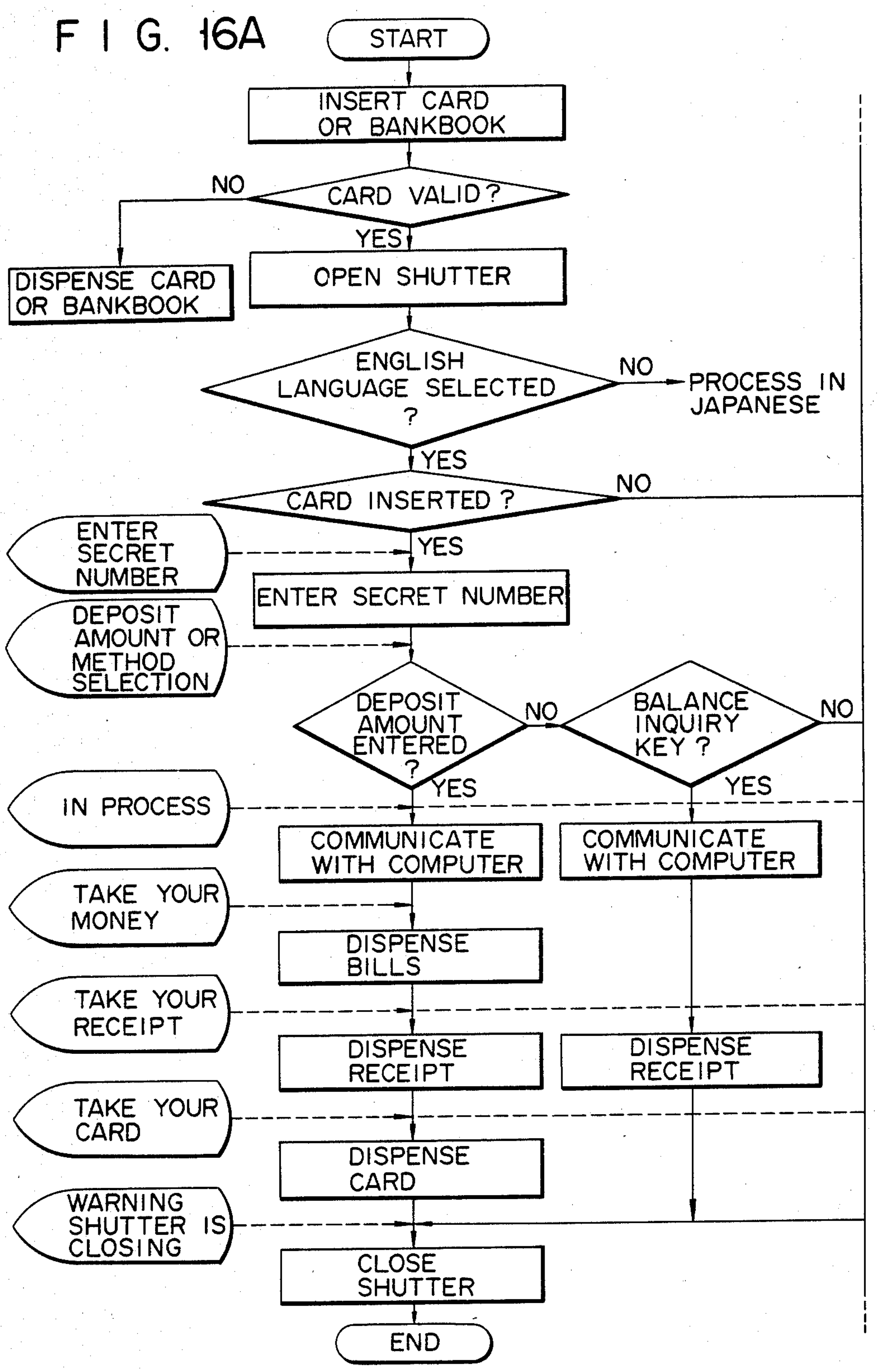
Figure 16B:
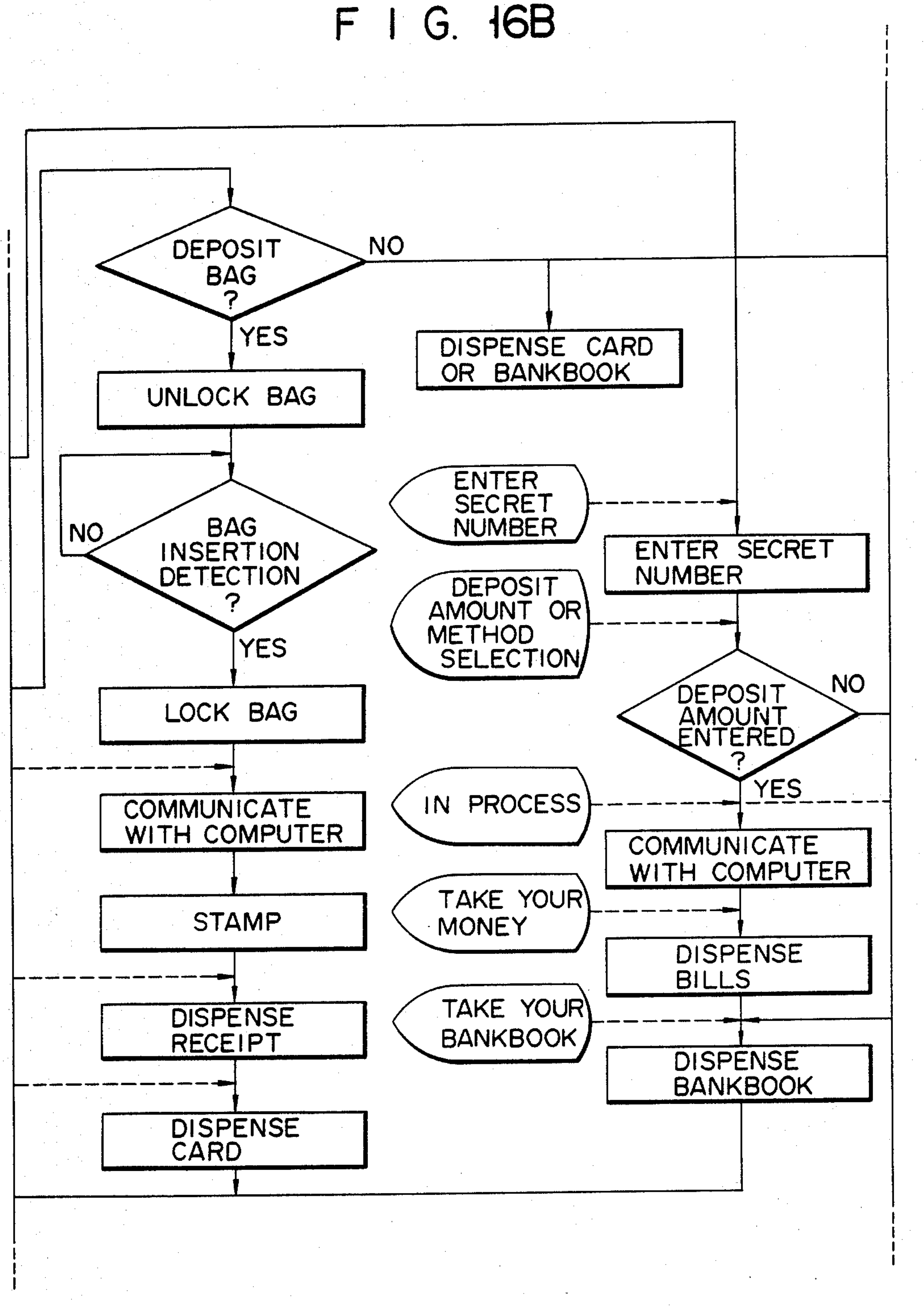

The operation of the ATM having the arrangement described above will be described with reference to the flow chart in FIG. 16. Assume that the customer inserts his card in the card insertion port 13. The data of the magnetic strip of the card is read by the magnetic head 34 and is supplied to the main control section 201. As a result, the main control section checks if a proper card has been inserted. If the main control section 201 determines that a proper card has been inserted, the solenoid **198*b* is energized and the fitting member 198*a* is moved upward. The fitting member 198*a* is released from the opening 15*b* which receives the arcuated shutter 15. The lock mechanism 198 of the arcuated shutter 15 is then released. Thereafter, the main control section 201 supplies the driving signal to the driver 217, thereby rotating the motor 194 in the direction indicated by the arrow m. Upon rotation of the motor 194, the rubber rollers 195 and 196 are rotated, so that the arcuated shutter 15** is moved in the direction indicated by arrow k.

Figure 17:
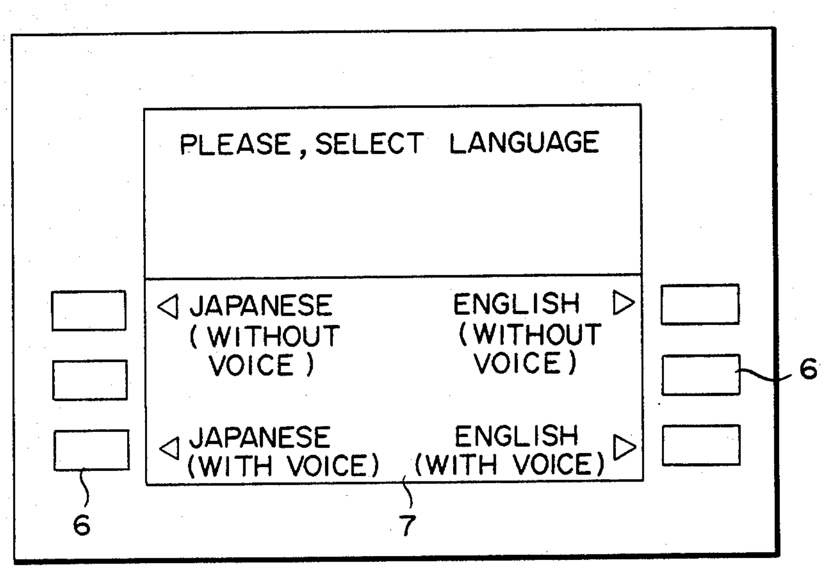
Figure 19:
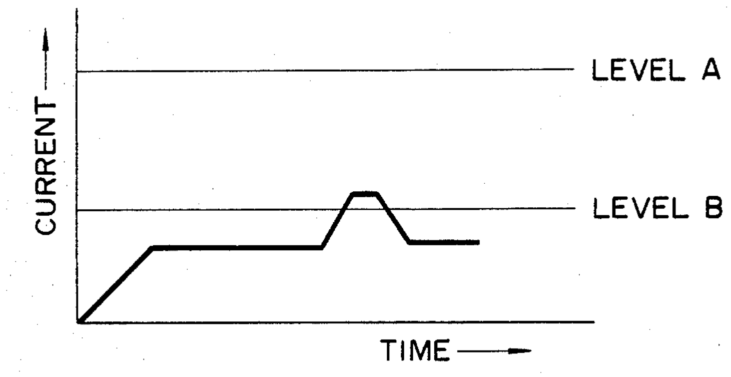

If the arcuated shutter 15 becomes immovable due to erroneous operation or the like during its opening movement, the rubber roller 196 slips relative to the power transmission member **15*a*, thereby overloading the motor 194. A current flowing through the driver 217 then increases. If the level of this current exceeds a level A as will be explained below in connection will FIG. 19, and if this is detected by the current detector 218, the current detector 218 supplies a stop signal to the main control section 201. The main control section 201 then causes the motor 194 to stop. In this manner, when the arcuated shutter 15 is completely stored in the housing 1, the detector 199 is turned on. The main control section 201 then receives the detection signal from the detector 199 and stops producing the driving signal, thereby stopping the motor 194. In this condition, the main control section 201 produces the language selecting signal to the operation/guide controller 208. The operation/guide controller 208 reads out either Japanese or English character pattern data from the memory 209 or 210, respectively. The display pattern of language selection is supplied from the operation/guide controller 208 to the driver 211. As shown in FIG. 17, the driver 211 selects one of the display modes: Japanese without voice; Japanese with voice; English without voice; and English with voice. The selected mode allows the display of corresponding characters at the CRT display 7**.

If the customer selects the mode "Japanese with voice", its selecting signal is supplied from the operation/guide controller 208 to the main control section 201 and the voice synthesizer 212. The main control section 201 then supplies a secret or confidential number signal to the operation/guide controller 208 and the voice synthesizer 212. The operation/guide controller 208 supplies a display pattern for such a secret number to the driver 211, using the Japanese pattern data. The driver 211 causes display of a message "Enter your secret number" and an instruction of a language selection key at the CRT display 7. At the same time, in the voice synthesizer 212, the selector 230 produces an address signal corresponding to the secret number request signal from the main control section 201 in response to the language selecting signal from the operation/guide controller 208. This address signal is supplied to the memory 231 for storing Japanese pattern data. The voice synthesizer 212 produces the speech pattern for the secret number request at the speaker 216 through the amplifier 215, using the Japanese pattern data stored in the memory 231. As a result, the message "Enter your secret number" is produced in Japanese at the speaker 216.

Figure 18:
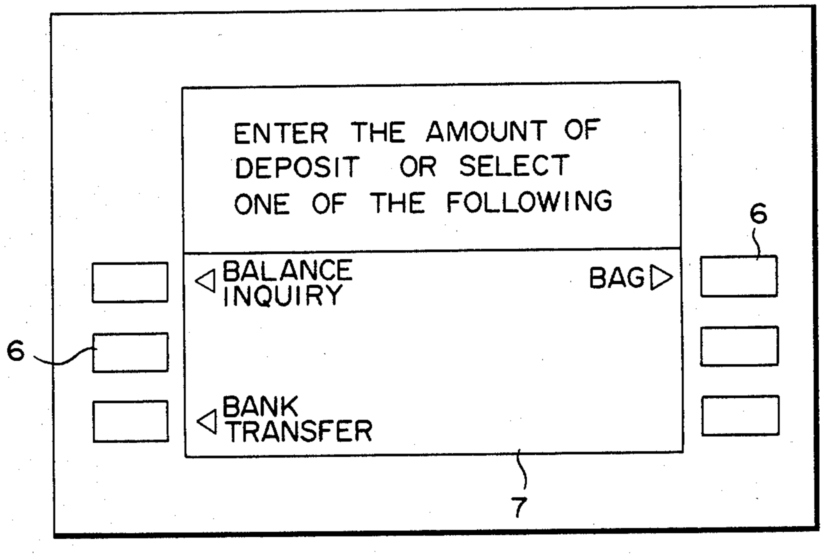

When the customer enters his secret number at the keyboard 6, a key-in signal is supplied from the operation/guide controller 208 to the main control section 201. The main control section 201 then determines whether or not the secret number read by the card reader 21 coincides with that entered at the keyboard 6. If the main control section 201 detects such a coincidence between these secret number data, it produces a method (item) selection signal to the operation/guide controller 208 and the voice synthesizer 212. As a result, the operation/guide controller 208 suppies a display pattern for withdrawal to the driver 211, using the Japanese pattern data in the memory 209. As shown in FIG. 18, the driver 211 causes display of a message "Enter the amount of withdrawal" or "Select one of the items below" and of instruction for the item selection key.

When the customer enters data corresponding to the desired withdrawl amount at the keyboard 6, the main control section 201 causes display of a message "Busy" at the CRT display 7 and production of a corresponding audible message at the speaker 216. When operation is completed, the main control section 201 produces a bill dispensing signal to the bill dispensing mechanism 22. Then, bills P from the first and second safes 53 and 54 are dispensed at the bill dispensing port 11.

The bills P from the first and second safes 53 and 54 dispensed through the bill dispensing mechanism 55 are detected by bill detectors 58 and 59 arranged in the convey paths **57*a* and 57*b*, respectively. The detected signals are supplied to the main control section 201 in which a count thereof (not shown) is counted up. The bills P are then detected by the bill detector 60 arranged in the common convey path 57*c*. The bills P are further conveyed to the second unit 52 through the second bill transfer portion 70**.

The bills P sequentially delivered to the second unit 52 are transferred to the convey path 77 through the bill receiving port 75. When the leading ends of the bills P are detected by the bill detector 79, and if they do not overlie and are regarded as proper bills P, the first sorting gate 78 lies to the left and the bills P are conveyed to the proper bill convey path 80. The bills are sequentially stacked in the temporary stacking section 91 through the impellers 90, and abut against the end faces of the separation stoppers 92. The bills are then separated from the impellers 90 and drop to be tidied together onto the conveyor belts 93 which travel in a direction opposite to the bill dispensing port 11. Thus, the ends of the bills are aligned with each other, and the bills are stacked in a tidy, aligned manner.

When bills corresponding to the specified withdrawal amount are dispensed from the safes 53 and 54 and are stacked, if they do not overlie and are regarded as the proper bills, and if the count of the counter of the main control section 201 coincides with the specified withdrawal amount, the conveyor belts of the bill dispensing system are temporarily stopped. The rotation of the impellers 90 is also stopped simultaneously when the above-mentioned conveyor belts stop.

Thereafter, the separation stoppers 92 pivot to push the bills P stacked in the temporary stacking section 91 onto the conveyor belts 93. The conveyor belts 93 start travelling in the direction toward the bill dispensing port 11, thereby dispensing the aligned bills P at the bill dispensing port 11.

Meanwhile, when the bill detector 105 detects the leading ends of the bills P, the solenoid 103 is energized to open the shutter 104. When the trailing ends of the bills are detected by the bill detector 102, the convey operation is stopped. The bills P are dispensed to the customer while their leading ends extend outward from the bill dispensing port 11 and their trailing ends are clamped between the pinch roller and each of the conveyor belts 93.

Simultaeously when the bills P are dispensed at the bill dispensing port 11, the main control section 201 causes display of a message "Please take your money" at the CRT display 7 and production of a corresponding audible message at the speaker 216. The customer takes the bills P from the bill dispensing port 11 in accordance with the guide message. Upon removal of the bills from the bill dispensing port 11, the main control section 201 causes the receipt issuing unit 25 to issue a corresponding receipt and causes display of a message "Please take your receipt" and production of the same message at the speaker 216. In this condition, the main control section 201 supplies an issuing signal to the print controller 203. The print controller 203 reads out the Japanese character pattern data from the memory 204 and supplies a display pattern corresponding to the transaction details to the drives 207 and 208. The driver 207 causes the receipt issuing unit 25 to issue a receipt on which the transaction details are printed in Japanese. The receipt is then dispensed at the receipt dispensing port 10. The driver 206 causes the printer 135 of the bankbook reader/printer 23 to print the transaction details in Japanese on the journal paper roll 139.

The customer takes the receipt from the receipt dispensing port 10 in accordance with the guide message. Upon removal of the receipt from the receipt dispensing port 10, the main control section 201 causes the card reader 21 to return the card to the customer and causes display of a message "Please take your card" at the CRT display 7. At the same time, the main control section 201 supplies the card return signal to the card reader 21. The card is then delivered from the card reader 21 to the card insertion port 13. The customer takes the card from the card insertion port 13 in accordance with the guide message. Upon removal of the card from the card insertion port 13, the main control section 201 determines to close the arcuated shutter 15 and causes display of a message "Warning: Shutter is closing" at the CRT display 7 and production of the same message of the speaker 216.

At the same time, the main control section 201 drives the driver 217, thereby rotating the motor 194 in the direction indicated by the arrow. Upon rotation of the motor 194, the arcuated shutter 15 is moved in the direction indicated by arrow n. When the detector 197 is turned off by the end portion of the arcuated shutter 15, the main control section 201 stops the motor 194 and the solenoid **198*b*. The fitting member 198*a* is moved downward and is fitted across the opening 15*b* for receiving the arcuated shutter 15. As a result, the shutter 15** is locked.

If the hand of the customer is caught between the arcuated shutter 15 and the horizontal operation panel, the rubber roller 196 slips relative to the power transmission member **15*a*, thus overloading the motor 194. A current flowing in the driver 217 increases. If the detector 218 detects that the level of this current exceeds a level B shown in FIG. 19, the current detector 218 supplies a stop signal to the main control section 201. The main control section 201 then stops the motor 194. Even if the hand of the customer is caught between the arcuated shutter 15 and the horizontal operation panel, the arcuated shutter 15 is stopped while his hand is only weakly held. Therefore, the customer can easily and safely remove his hand from the arcuated shutter 15**.

When the detector 18 detects during the closing operation of the arcuated shutter 15 that the card is left in the housing 1, the main control section 201 stops the motor 194 so as to stop the movement of the arcuated shutter 15 and to start the timer 219. When a predetermined time interval has elapsed after the detector 18 detects that the card is left inside the machine, the main control section 201 drives the motor 194 in accordance with the timeout signal from the timer 219, thereby completely closing the shutter 15. It should be noted that the shutter 15 is locked by the locking mechanism 198 whenever the shutter 15 is completely closed, as previously mentioned.

On the other hand, when the customer depresses a key corresponding to balance inquiry at the time of item selection, the main control section 201 causes display of a message "Busy" at the CRT display and production of the same message at the speaker 216. When operation is completed, the main control section 201 produces the balance data to the print controller 203. The print controller 203 drives the driver 207 to issue a receipt on which only a corresponding balance is printed. This receipt is dispensed at the receipt dispensing port 10. Thereafter, the main control section drives the driver 217 to close the shutter 15 as previously described.

On the other hand, when the customer depresses a key corresponding to bag dispensing at the time of item selection, the main control section 201 supplies a lock release signal to the bag processing unit 24. The bag processing unit 24 energizes the solenoid 159 to move the coupling lever 161 downward. The locking arm 155 pivots about the projection **163*a* in the direction indicated by arrow d. The locking arm 155 is released from the locking pawl, and locking of the bag dispenser is released. In this case, the main control section 201 causes display of a message "Take a bag, insert checks, notes, or bills, close the bag, and insert the bag" at the CRT display 7 and production of the same message at the speaker 216. When the customer pulls the handle 8 in accordance with the guide message, one bag can be dispensed by the bag dispensing plate 158 at the opening portion 154. If the customer cannot successfully remove the bag, he can repeat the procedure for removing a bag. The customer then inserts checks, notes or bills in the bag and closes the bag. He then inserts the bag in the bag insertion port 9. The main control section 201 deenergizes the solenoid 159 in response to the detection signal from the bag detector 170, so that the coupling lever 161 is moved upward and returns to its initial position. Upon movement of the coupling lever 161, the locking arm 155 pivots in the direction indicated by arrow c. The locking arm 155 then engages with the locking pawl 158*a*. As a result, further bag dispensing by means of the handle 8 is prohibited. When the bag is detected by the bag detector 171, the motor 176** stops.

The main control section 201 then causes display of a message "Busy" at the CRT display 7 and production of the same message at the speaker 216. When operation is completed, the main control section 201 supplies a driving signal to the printer 168 of the bag processing unit 24. The solenoid 186 is energized to move the coupling lever 183 in the direction indicated by arrow h. The cam plate 182 pivots about the shaft 182a to move the index stamper 180 downward, thereby printing a stamp on the bag. Thereafter, the solenoid 186 is deenergized to return the lever 183 in the direction indicated by the arrow g, thereby returning the index stamper 180 to the initial position. The motor 176 is then driven again to move the bag further. When the bag is detected by the bag detector 172, the motor 176 is then stopped again, thereby energizing the solenoid 186 again. The cam plate 182 then pivots to move the index stamper 180 downward, and a second stamp is printed on the bag. Thereafter, the solenoid 186 is deenergized and the index stamper 180 returns to the original position. The pulse motor 176 is then driven again to move the bag and the bag is then stored in the hopper 169. In this manner, the bag is stamped twice, so that even a bag having a three-dimensional surface due to enclosure of checks, notes or bills can be properly stamped. Thereafter, a receipt is issued, and the card is then dispensed.

On the other hand, even when the customer inserts his bankbook, the ATM is operated in a similar manner as in the case of card insertion. If the customer selects the mode "Japanese without voice", the operation is the same as the mode "Japanese with voice" except that the former mode is not accompanied by voice production. The modes "English with voice" and "English without voice" can be set in the same manner as the modes "Japanese with voice" and "Japanese without voice", respectively.

Figure 20:
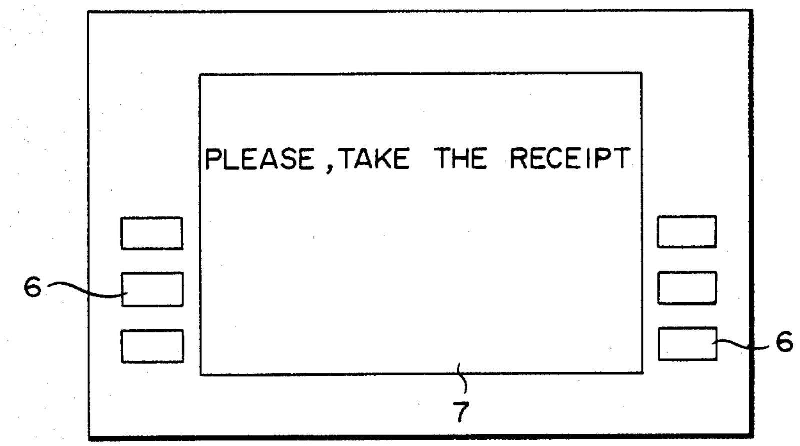
Figure 21:
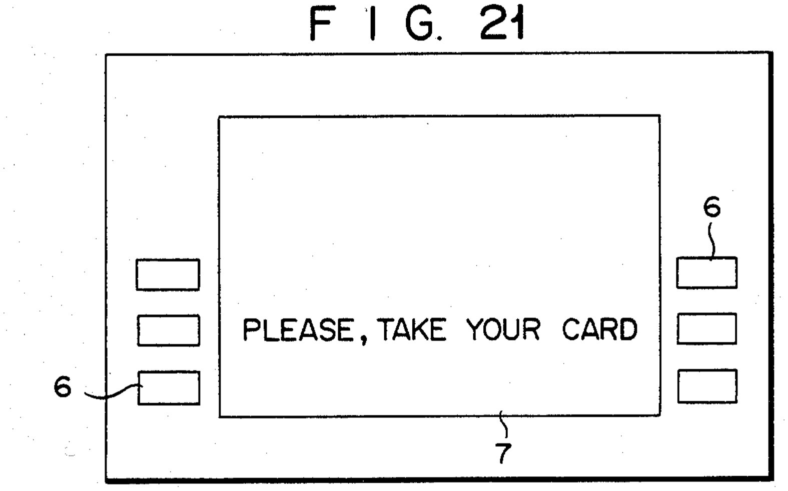

The operation guide display at the CRT display 7 in each operating step may be performed at different positions thereof, as shown in FIGS. 20 and 21. Even if similar display contents are continuously displayed, the customer can notice the change in display contents, thereby decreasing erroneous operation.

In the above embodiment, voice guidance is selectively added to a complete sequence of visual displays at the CRT display. However, voice guidance may be partially performed. Further, the bag is stamped twice in the above embodiment. However, the number of stamping operations is not limited to two, but may be extended to a plurality of times in excess of two. In the above embodiment, Japanese and English languages are used. However, the present invention is not limited to these languages, but may be extended to a combination of two other languages, a combination of two other languages or more, or a combination of voice production and Braille dots for the blind. In the above embodiment, language selection is performed at the keyboard. However, language selection may be performed such that a code is given to the selected language and this code is magnetically written on the card or bankbook, thereby allowing reading of this code. Thus, the key input operation may be eliminated. Alternatively, language selection may be performed such that a key input operation is performed for the first transaction, and any subsequent transaction is automatically performed in the language selected for the first transaction.

Furthermore, in the language selection step, a display of two language options is performed at one time. However, the Japanese and English messages may be alternately displayed for a predetermined period of time, thereby obtaining the same effect as in the above embodiment. In the above embodiment, the selection between "language with voice" and "language without voice" is performed by the customer at the keyboard. However, a mode selector may be arranged in the ATM to preselect the mode with or without voice. For example, during daytime, the mode without voice may be set, whereas the mode with voice may be set at nighttime, thereby providing practical effects. Furthermore, if the mode selector is arranged in the host computer, but not in the housing of the ATM, guide messages can be instructed through a transmitter.

What is claimed is:

1. An automatic transaction machine comprising:

a housing having an outer portion and an inner portion with respect to a wall;

a transaction medium insertion port disposed as said outer portion for inserting thereat a transaction medium on which transaction information is recorded;

reading means for reading the transaction information from the transaction medium inserted at said transaction medium insertion port;

an operation section for entering a sequence of transaction data associated with the transaction information on the transaction medium;

means for dispensing a negotiable medium in accordance with the transaction information read by said reading means from the transaction medium and with the transaction data entered at said operation section;

a shutter disposed to be opened/closed with respect to said operation section, said shutter having an arcuated shape so as to extend over said outer portion of said housing;

a shutter driving section for driving said shutter so as to open/close said shutter; and a storage section for storing said shutter in said inner portion of said housing.

2. A machine according to claim 1, wherein said shutter driving section comprises:

overload detecting means for detecting an accidental overload imposed on said shutter while said shutter is being driven; and shutter safe driving means for performing one of operations of stopping said shutter in accordance with a detection result from said overload detecting means and driving said shutter in a direction opposite to a shutter closing direction.

3. A machine according to claim 2, wherein said overload detecting means includes means for discriminating a detection level of the overload during a shutter opening operation from a detection level of the overload during a shutter closing operation.

4. A machine according to claim 1, wherein said shutter driving section comprises:

foreign matter detecting means for detecting foreign matter within a space enclosed by said shutter; and shutter safe driving means for performing one of operations of stopping movement of said shutter in accordance with detection of foreign matter by said foreign matter detecting means and driving said shutter in a direction opposite to a shutter closing direction, and for closing said shutter after a predetermined time interval has elapsed.

5. A machine according to claim 1, wherein said shutter driving means comprises:

overload detecting means for detecting an accidental overload imposed on said shutter while said shutter is being driven;

first shutter safe driving means for performing one of operations of stopping said shutter in accordance with a detection result from said overload detecting means and driving said shutter in a direction opposite to a shutter closing direction;

foreign matter detecting means for detecting foreign matter within a space enclosed by said shutter; and second shutter safe driving means for performing one of operations of stopping movement of said shutter in accordance with detection of the foreign matter by said foreign matter detecting means and driving said shutter in a direction opposite to a shutter closing direction, and for closing said shutter after a predetermined time interval has elapsed.

6. An automatic transaction machine comprising:

a housing having an outer portion and an inner portion with respect to a wall;

a transaction medium insertion port disposed at said outer portion for inserting thereat a transaction medium on which transaction information is recorded;

reading means for reading the transaction information from the transaction medium inserted at said transaction medium insertion port;

an operation section for entering a sequence of transaction data associated with the transaction information on the transaction medium;

means for dispensing a negotiable medium in accordance with the transaction information read by said reading means from the transaction medium and with the transaction data entered at said operation section;

a shutter disposed to be opened/closed with respect to said operation section;

overload detecting means for detecting an overload imposed on said shutter while said shutter is being driven;

shutter safe driving means for performing one of operations of stopping said shutter in accordance with a detection result from said overload detecting means and driving said shutter in a direction opposite to a shutter closing direction;

a shutter driving section for driving said shutter so as to open/close said shutter, said shutter driving section including said overload detecting means and said shutter safe driving means; and a storage section for storing said shutter in said inner portion of said housing when said shutter is open.

7. A machine according to claim 6, wherein said overload detecting means includes means for discriminating a detection level of the overload during a shutter opening operation from a detection level of the overload during a shutter closing operation.

8. A machine according to claim 6, wherein said shutter driving section further comprises:

foreign matter detecting means for detecting foreign matter within a space enclosed by said shutter; and shutter safe driving means for performing one of operations of stopping movement of said shutter in accordance with detection of the foreign matter by said foreign matter detecting means and driving said shutter in a direction opposite to a shutter closing direction, and for closing said shutter after a predetermined time interval has elapsed.

9. An automatic transaction machine comprising:

a housing having an outer portion and an inner portion with respect to a wall;

a transaction medium insertion port disposed at said outer portion for inserting thereat a transaction medium on which transaction information is recorded;

reading means for reading the transaction information from the transaction medium inserted at said transaction medium insertion port;

an operation section for entering a sequence of transaction data associated with the transaction information on the transaction medium;

means for dispensing a negotiable medium in accordance with the transaction information read by said reading means from the transaction medium and with the transaction data entered at said operation section;

a shutter disposed to be opened/closed with respect to said operation section;

foreign matter detecting means for detecting foreign matter within a space enclosed by said shutter; and shutter safe driving means for performing one of operations of stopping movement of said shutter in accordance with the detection of foreign matter by said foreign matter detecting means and driving said shutter in a direction opposite to a shutter closing direction, and for closing said shutter after a predetermined time interval has elapsed.

* * * * *